United States Patent [19]

Sieron et al.

[11] 4,144,462
[45] Mar. 13, 1979

[54] EMERGENCY LIGHTING FLUORESCENT PACK

[75] Inventors: Richard L. Sieron, Fairfield; Edward P. Kozek, Southbury; William P. Shine, Monroe, all of Conn.

[73] Assignee: Dual-Lite, Inc., Newtown, Conn.

[21] Appl. No.: 791,953

[22] Filed: Apr. 28, 1977

[51] Int. Cl.² .................. H02J 9/06; H05B 41/29
[52] U.S. Cl. .................. 307/66; 323/60; 315/86; 315/224; 315/105; 307/130
[58] Field of Search .............. 307/66; 315/86, 105, 315/224; 339/50 R; 323/61, 60

[56] References Cited

U.S. PATENT DOCUMENTS

| | | | |
|---|---|---|---|
| 3,356,891 | 12/1967 | Godard | 315/86 |
| 3,739,255 | 6/1973 | Leppert | 323/6 |
| 3,836,815 | 9/1974 | Herzog | 315/86 |
| 3,989,335 | 11/1976 | Belokin | 339/50 R |
| 3,996,495 | 12/1976 | Herman | 315/244 |
| 4,004,185 | 1/1977 | Edmondson | 315/105 |
| 4,004,188 | 1/1977 | Cooper | 315/261 |
| 4,005,335 | 1/1977 | Perper | 315/224 |
| 4,023,067 | 5/1977 | Zelina | 315/209 R |
| 4,042,852 | 8/1977 | Zaderei | 315/97 |
| 4,056,757 | 11/1977 | Mauch | 315/86 |

*Primary Examiner*—L. T. Hix
*Assistant Examiner*—S. D. Schneyer
*Attorney, Agent, or Firm*—Mattern, Ware, Davis & Stoltz

[57] ABSTRACT

A high frequency self-contained emergency lighting fluorescent pack is exteriorally mountable to a fluorescent fixture either in line with a fluorescent lamp having a length shorter than that normally installed in the fluorescent fixture or in a side-by-side relationship near the fluorescent lamp. In either configuration, the emergency lighting fluorescent pack de-energizes all electrical connections when the interconnected fluorescent lamp is not properly in place, and only energizes the electrical connections when the fluorescent lamp is properly installed.

The emergency lighting fluorescent pack incorporates a battery pack, a battery charger for maintaining the batteries in the battery pack at full charge, a high frequency emergency power generating inverter module for igniting and maintaining the fluorescent lamp in the illuminated state by energy supplied by the battery pack, and transfer circuitry for causing the energization of the emergency power module by the battery pack when utility AC power fails.

Low voltage solid state electronic circuitry in conjunction with a unique application of a high frequency ferroresonant transformer allows for the use of relatively low voltage batteries to drive the emergency lighting fluorescent pack while also providing for the ignition and maintenance of the fluorescent lamp in the illuminated state without the need for heating the filament windows of the fluorescent lamps.

72 Claims, 15 Drawing Figures

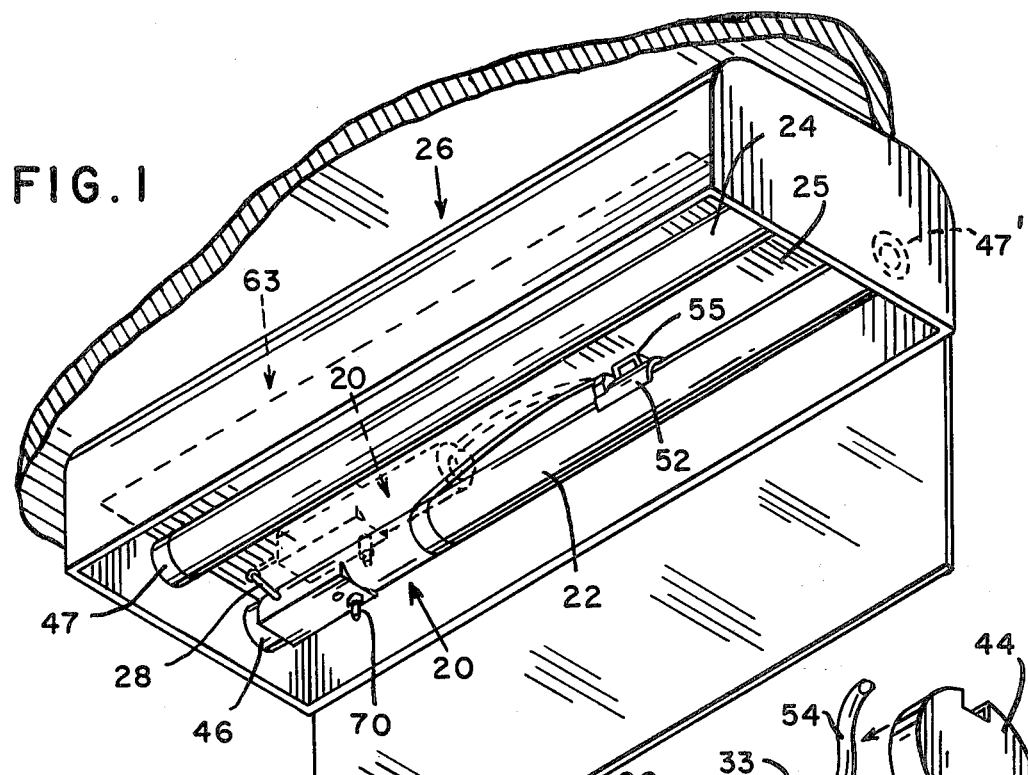
FIG. 1
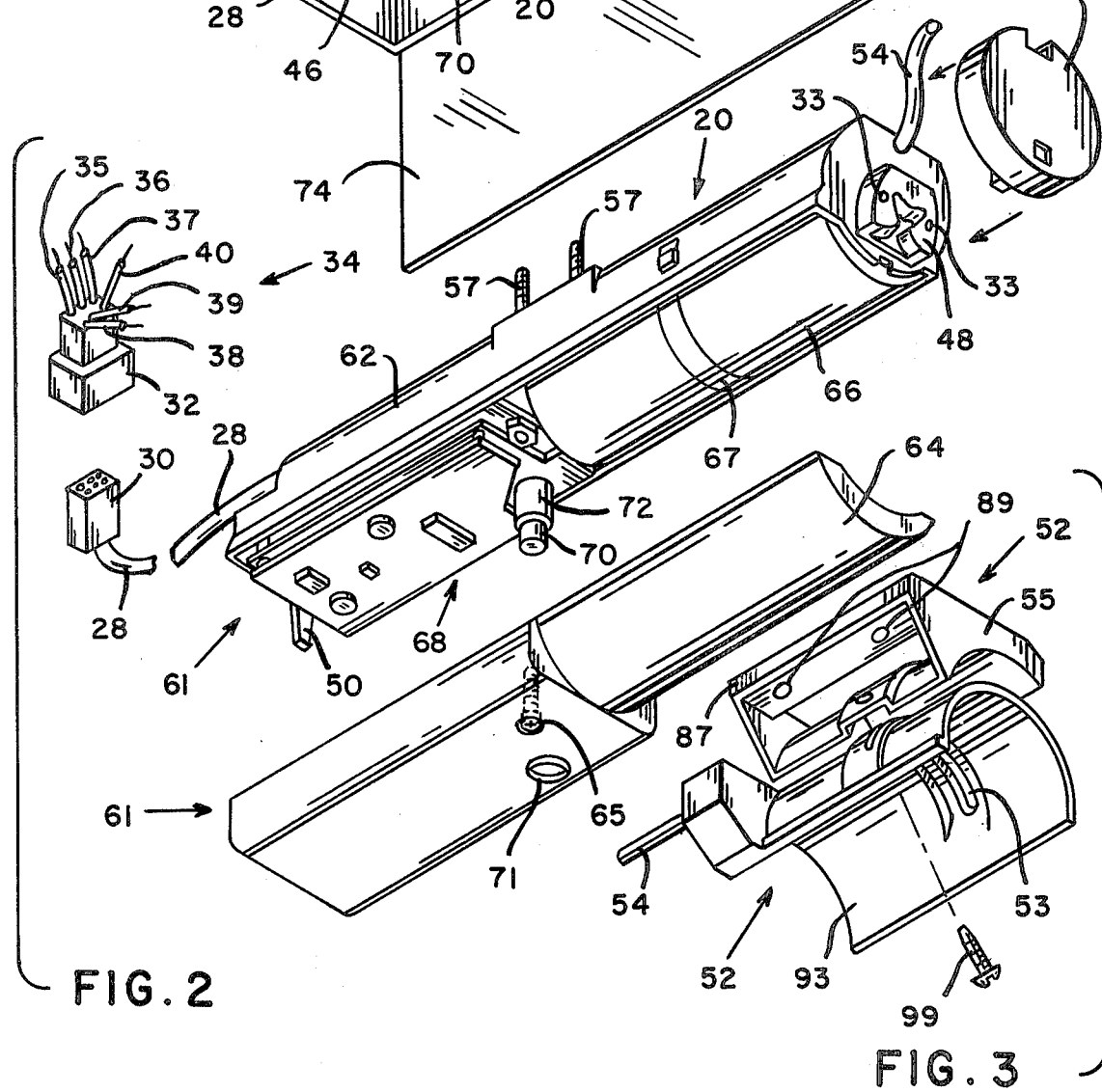
FIG. 2
FIG. 3

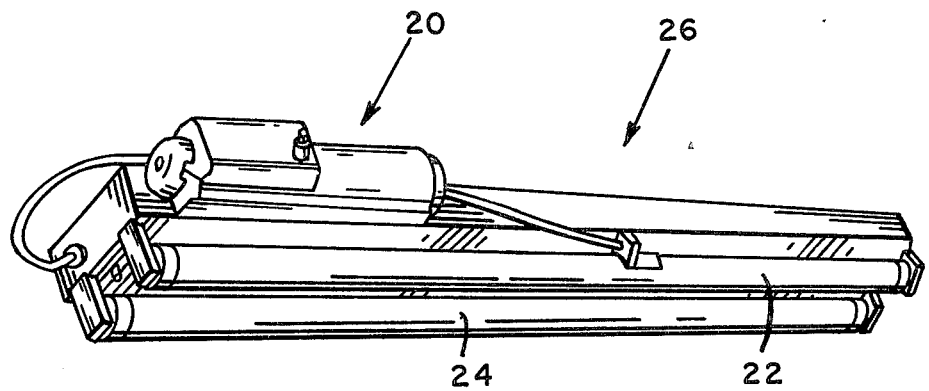
FIG. IA
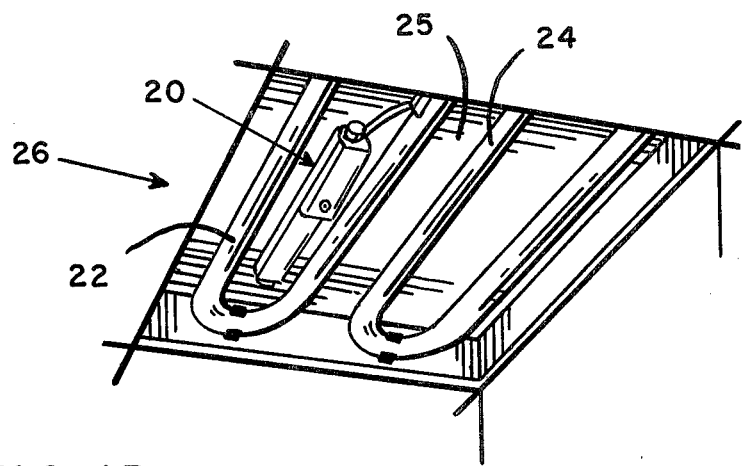
FIG. IB
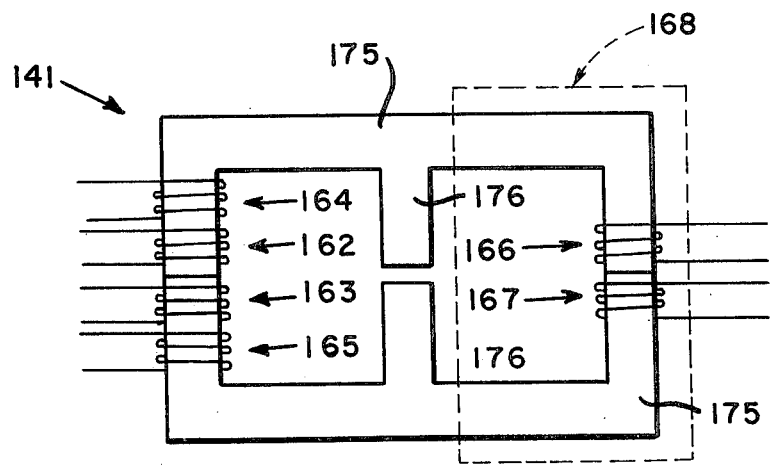
FIG. II

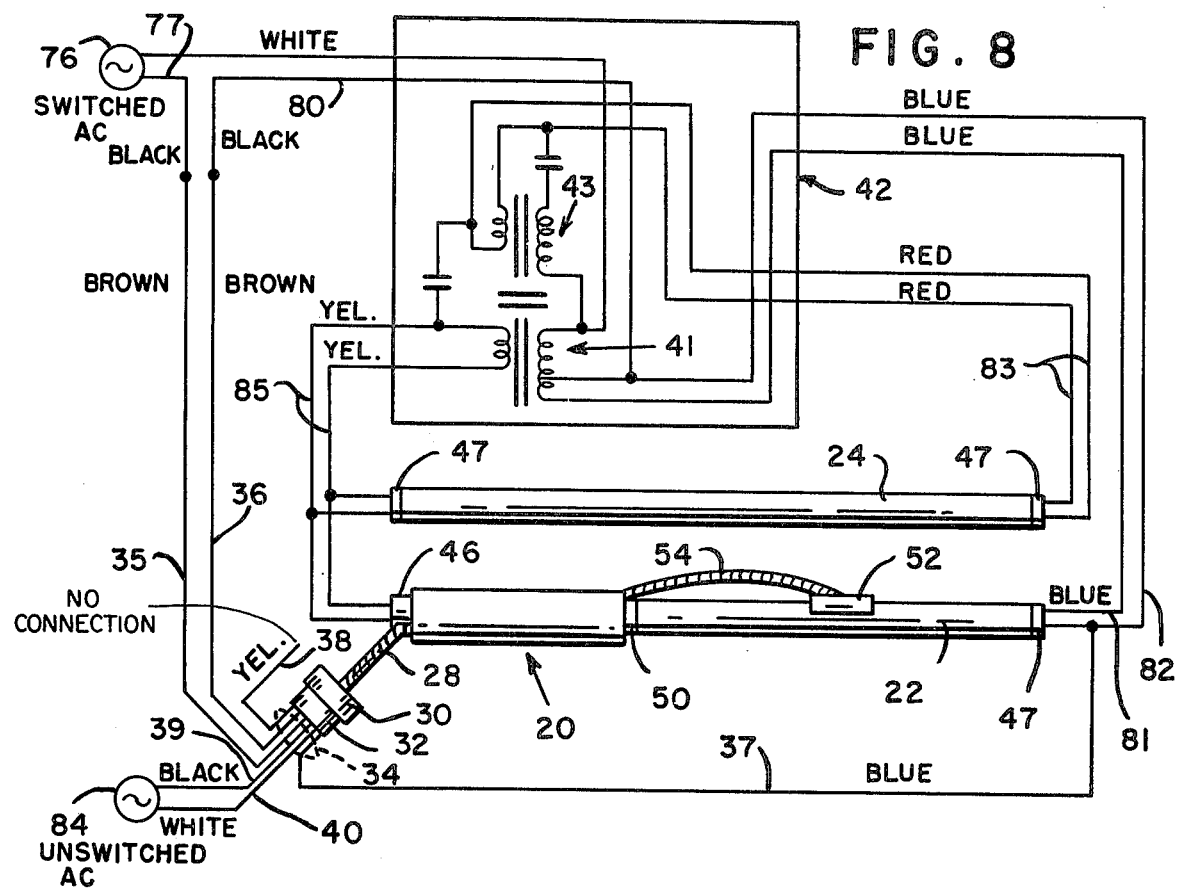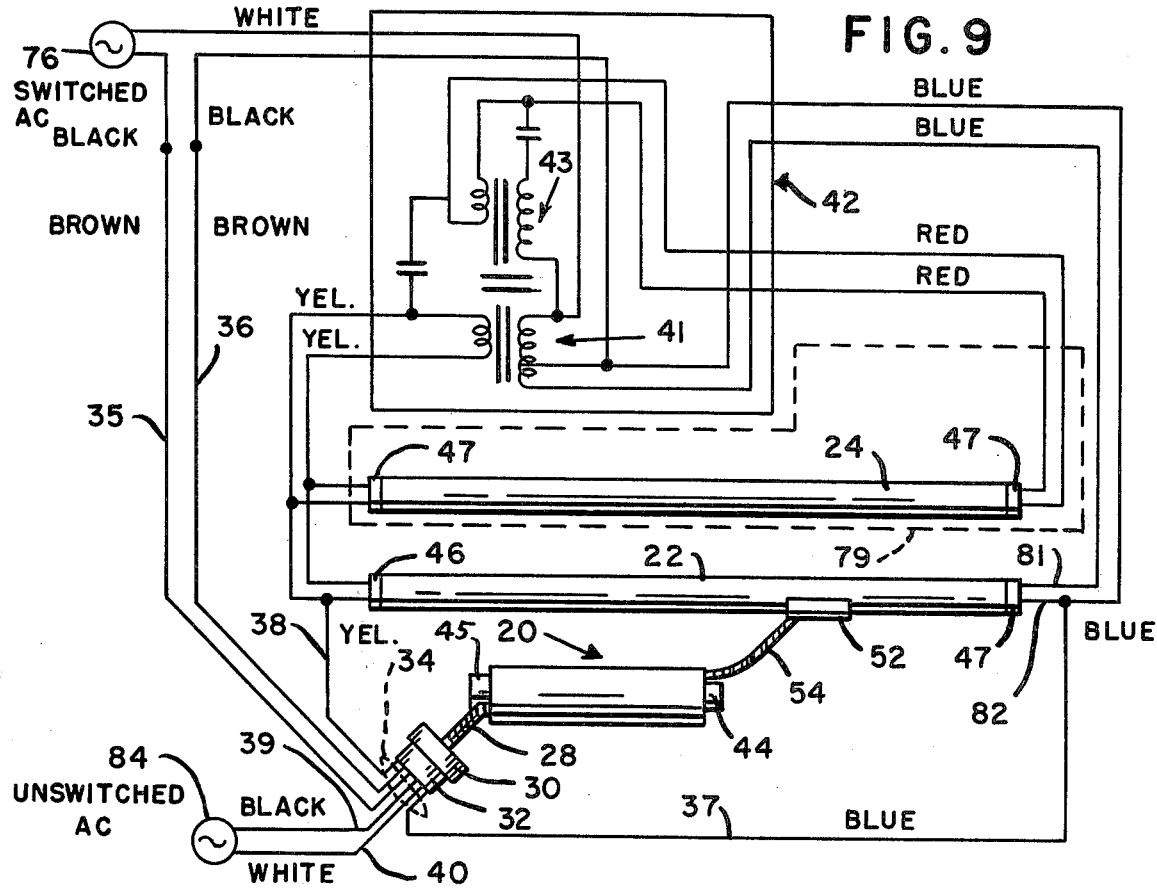

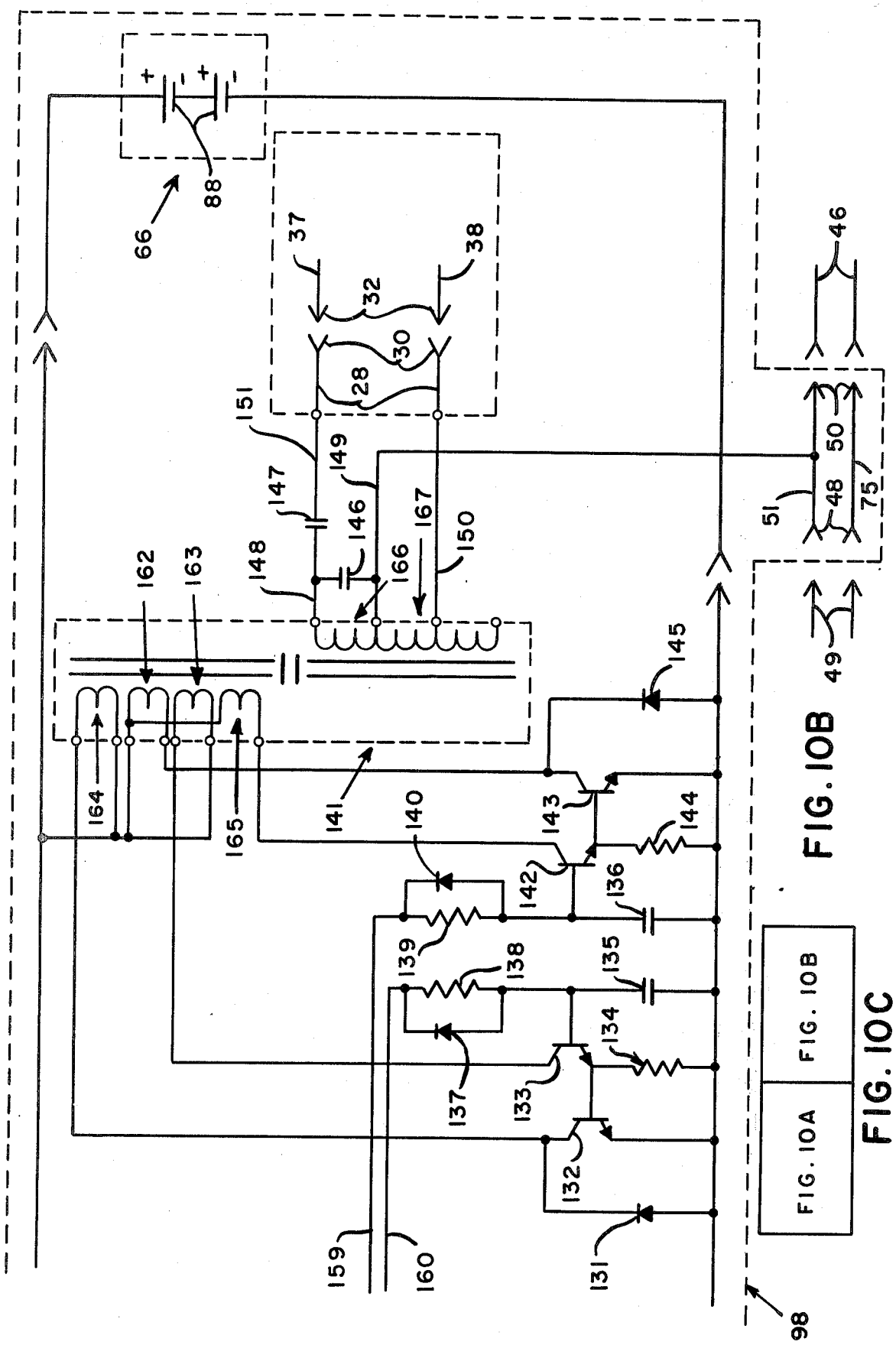

EMERGENCY LIGHTING FLUORESCENT PACK

BACKGROUND OF THE INVENTION

1. Field of the Invention

The present invention relates to self-contained emergency lighting packs for use with fluorescent lamps or tubes in standard fluorescent fixtures in order to provide for the illumination of at least one fluorescent lamp during times of power outages.

2. Description of the Prior Art

A number of prior art patents deal with emergency lighting devices. These patents are set forth in Table I.

Although many of these patents deal with the activation of fluorescent lamps, none of these patents disclose or suggest any of the novel features of the present invention. Specifically, the emergency lighting fluorescent pack of the present invention is a self-contained pack which may be synergistically mounted in line with a fluorescent lamp or alongside a fluorescent lamp. It is not necessary, nor is it desirable, to mount the pack within the portion of the fluorescent fixture containing the ballast used to drive the lamps when utility AC power is present. By mounting to the exterior of the fluorescent fixture, lower ambient temperatures are encountered, thereby improving the operation and extending the life of the batteries.

None of the prior art patents disclose or suggest a self-contained emergency lighting fluorescent pack which may

TABLE I

| Patent No. | Inventor | Title | Date |
| --- | --- | --- | --- |
| 2,170,456 | H.W. Lord | Electric Discharge Apparatus | 1939 |
| 2,401,555 | F.C. De Reamer | Lighting System for Tubular Lamps And Holders For Use Therein | 1946 |
| 2,541,033 | J. Cates | Circuits For Electric Discharge Lamps | 1951 |
| 3,217,156 | G.W. Sherwood | Emergency Lighting System | 1965 |
| 3,233,091 | S. Hunt | Portable Stand-By Emergency Light Unit | 1966 |
| 3,239,716 | V.M. Brooks | Safety Circuit For Sequence Start Ballast With Disconnect Switches In The Primary And Secondary Windings | 1966 |
| 3,336,472 | W. Steinig | Device For The Safety Lighting of Rooms or Open-Air Installations | 1967 |
| 3,448,335 | B.F. Gregory et al | High Frequency AC-DC Fluoroescent Lamp Driver Circuit | 1969 |
| 3,591,796 | John S.N. Barker | Emergency Electric Lighting Installations | 1971 |
| 3,659,179 | Barker et al | Emergency Electric Lighting Units | 1972 |
| 3,660,714 | E.A. Chandler | Emergency Lighting System | 1972 |
| 3,684,891 | R.L. Sieron | Fail-Safe Solid-State Emergency Lighting Power Supply and Transfer Circuit | 1972 |
| 3,688,123 | A.H.B. Walker | Emergency Fluorescent Lighting Apparatus | 1972 |
| 3,758,823 | P.L. Jett et al | Battery Powered Fluorescent Light | 1973 |
| 3,906,243 | R.R. Herzog | Retrofit Emergency Lighting System | 1975 |
| 3,912,969 | K. Nakai et al | Discharge Lamp Lighting Apparatus | 1975 |
| 3,946,301 | R.R. Love | Direct Current to Alternating Current Electronic Inverter With Overload and Short-Circuit Protection Circuitry | 1976 |
| 3,975,660 | F. Knobel et al | Starterless Low-Voltage Fluorescent-Lamp Circuit Arrangements | 1976 | be used in line with a standard fluorescent lamp. Thus, U.S. Pat. No. 3,336,472, Steinig, discloses a device for supplying emergency lighting which is installed within a fluorescent lighting fixture. The device is placed within an elongated housing similar to a fluorescent lamp and incorporates therein batteries, electronic circuitry, and a light source 10. Thus, this device is not used in line with a standard fluorescent lamp but is used in substitution of an entire lamp.

U.S. Pat. No. 2,401,555, De Reamer, discloses a holder for series-connected fluorescent lamps, the holders interposed between these series-connected lamps. These holders however do not embody electronic circuitry for driving these lamps during power outages and are primarily utilized for insuring the deenergization of the lighting system when any particular fluorescent lamp is not properly in place.

Finally, U.S. Pat. No. 3,659,179, Barker et al., discloses an emergency electric lighting unit which is mounted onto a main fluorescent lamp 15 so as to provide emergency power via auxiliary fluorescent lamp 16. This emergency lamp is not in line with the standard fluorescent lamp 15 but is merely added onto the standard lamp, unlike the present invention.

The present invention also incorporates a new element; namely, a safety cradle mounted to the fluorescent fixture so as to close a microswitch mounted within the cradle when the fluorescent lamp is properly installed within the fluorescent fixture. This safety cradle may be used in all mounting arrangements of one version of the present invention and insures that the electrical connections to all fluorescent lamps electrically associated with the lamp selected to be driven by the pack during power outages are de-energized until such time that the latter fluorescent lamp is properly installed. Another version of the pack for original equipment manufacturers, does not utilize a safety cradle. This electrical de-energization prevents any shock hazard from utility AC or the higher voltage emergency generated power when replacing the lamp driven by the emergency pack. The use of a safety cradle in conjunction with an emergency lighting fluorescent pack to insure the de-energization of the pack and the terminals to which the fluorescent lamps interconnect is not disclosed or suggested by any of the cited prior art. Thus, although U.S. Pat. No. 3,239,716, Brooks, discloses a safety circuit for a sequence start ballast having disconnect switches in the primary and secondary windings, the circuitry disclosed therein utilizes one of two fluorescent lamps as a circuit breaker with respect to the potential of the operating circuit. That is, the lamp displacement is utilized to render the starting circuit inoperative. The circuitry disclosed in Brooks does not utilize an external safety cradle having a switch making contact with the exterior of a fluorescent lamp so as to de-energize the circuitry when the lamp is misaligned.

U.S. Pat. No. 2,401,555, De Reamer, merely discloses the use of lamp holders 4 in conjunction with a series-connected fluorescent lighting system, the holders incorporating switch contact 33 and 34 to insure the de-energization of the fluorescent lamps when they all are not properly installed within these holders. Thus, these holders are connected in series with the fluorescent lamps unlike the present invention where the safety cradle switch contacts the exterior of a fluorescent lamp and does not make electrical connection therewith.

The emergency lighting fluorescent pack according to the present invention also incorporates a ferro-resonant transformer operating at a high frequency, typically 11 kilohertz, whose output characteristics match the power requirements of the driven fluorescent lamp. This high frequency sinusoidal voltage impressed upon the fluorescent lamp ensures lamp ignition without the necessity of heating the filaments found within the lamp. In normal operation, these filaments are heated in order to produce free electrons and thereby enable ignition of the fluorescent lamp at utility line voltages. By use of high frequency sinusoidal electrical power, the ferro-resonant transformer ignites the fluorescent lamp with a voltage of between 300 and 600 VRMS at a power output of approximately ten watts. In order to sustain ionization of the lamp, five watts of power at approximately 120 volts RMS is needed. Maintenance of 300 to 600 VRMS across the lamp would quickly destroy it. By use of the ferro-resonant transformer operating in the constant current portion of its operation curve, the desired maintainance of a fluorescent lamp ionization is obtained at a low power requirement; that is, at a low current level. Such would not be possible with a conventional transformer since in order to generate the ten watts of power at three to six hundred volts RMS would necessitate more than ten watts of output power by the secondary transformer if it were clamped to a voltage drop of approximately 120 VAC, that is, the normal operating voltage of the fluorescent lamp.

Although ferro-resonant transformers have been widely used in generating alternating current and for voltage regulation thereof, such applications have typically been in the fifty to sixty hertz range. Furthermore, such ferro-resonant transformers are normally only operated along the constant voltage portion of their operating curve rather than along the constant current portion of the curve. Thus, although U.S. Pat. No. 3,946,301, Love, discloses a direct DC-AC inverter utilizing a ferro-resonant transformer 88, this inverter is disclosed as operating in the low frequency range, typically sixty hertz.

Furthermore, although a number of the cited prior art patents are used in emergency fluorescent lighting devices operating at high frequency during their emergency mode, such devices do not use a ferro-resonant transformer as part of their operating circuitry. Thus, U.S. Pat. No. 3,684,891, Sieron, assigned to the present assignee, discloses a failsafe solid state emergency lighting power supply and transfer circuit for a fluorescent lamp which operates at a frequency of approximately ten kilohertz. However, the oscillator output transformer 42 is not of a ferro-resonant design. Similarly, U.S. Pat. No. 3,906,243, Herzog, discloses a retrofit emergency lighting system for fluorescent lamps which utilizes a three kilohertz inverter for supplying emergency power to the fluorescent lamps. The frequency of operation is defined as being in the range of 2.5 kilohertz to 4.0 kilohertz and utilizes a standard transformer having a primary winding 25 and a secondary winding 26 for supplying the power from the inverter 20 to the circuitry associated with driving the fluorescent lamp. Similarly, U.S. Pat. No. 3,448,335, Gregory et al., discloses a high frequency AC-DC fluorescent lamp driver circuit operating at a frequency of approximately five to twenty kilohertz utilizing a saturable core output transformer T1 in order to drive the fluorescent lamp.

SUMMARY OF THE INVENTION

A self-contained emergency lighting fluorescent pack according to the present invention is mountable to a fluorescent fixture either in-line with a fluorescent lamp or alongside a fluorescent lamp in order to provide emergency electrical power to the lamp during power outages. The fluorescent pack incorporates an electrically interconnected safety cradle mounted to the fluorescent fixture in a position to interfit with the fluorescent lamp when the lamp is properly mounted in the fluorescent fixture. A switch within the safety cradle remains open until the lamp is properly positioned within the cradle. When this switch is open, both the fluorescent pack and the fluorescent fixture sockets are de-energized to eliminate any shock hazard when changing lamps. Only when the switch is closed are the fluorescent fixture sockets and emergency pack energized.

The present emergency lighting fluorescent pack also incorporates an electrical harness with an accompanying polarized plug for interconnecting with a mating polarized plug and harness. This latter harness includes wiring for electrically connecting the dual lamp ballast used with standard rapid start fluorescent lamps to a switchable source of utility AC power. This source of AC is typically used to turn the lamps on and off. This latter harness also includes wiring for connection to an unswitched source of utility AC power as well as to the fluorescent lamp driven by the emergency pack. The switched and unswitched AC are connected to the same utility AC power and therefore loss of one necessarily means loss of both sources.

By being mountable on the exterior of the fluorescent fixture, either in-line or alongside the fluorescent lamp, the present fluorescent pack is not subjected to the high temperature environment found within the ballast compartments of standard fluorescent fixtures. By being outside of the ballast compartment, the present invention therefore operates at a much lower temperature, insuring long life to the electrical components within the fluorescent pack and batteries used to provide the emergency power.

When the emergency lighting fluorescent pack is mounted inline with a fluorescent lamp, a standard fluorescent lamp, having a length shorter than the lamp that would normally be installed in the fluorescent fixture is utilized due to the length of the fluorescent pack. For a fluorescent fixture using four foot lamps, the in-line mounting of the fluorescent pack would utilize a three foot fluorescent lamp, the remaining one foot being replaced by the fluorescent pack. In this mounting embodiment of the present invention, the fluorescent pack incorporates removable end caps for electrically connecting one end of the device to the normal electrical lamp socket of the fluorescent fixture and the other end of the fluorescent pack to one end of the shorter fluorescent lamp.

When mounted alongside the fluorescent lamps, the same fluorescent lamps as normally used in the fluorescent fixture are utilized, the only electrical connections then being from the electrical harness of the fluorescent pack to the alternating current ballast within the fluorescent fixture and to the utility AC source.

The electronic circuitry utilized by the present invention incorporates a high-frequency DC-AC inverter emergency power module for generating a high frequency alternating electrical current source operating at approximately 11 kilohertz. A pair of main power transistors are utilized having base drive circuitry without the need for base drive resistors which would typically consume approximately ten percent of the battery power. Instead, the drive transistors for the main power switching transistors utilize auxiliary drive primary windings on the ferro-resonanant transformer for proper biasing. The current flow through these auxiliary windings as well as the primary windings associated with the switching transistors provide the necessary magnetic flux to the ferro-resonant transformer while minimizing wasted battery power.

Furthermore, the ferro-resonant transformer is uniquely designed to match the power requirements of the driven fluorescent lamp so as to provide a relatively high voltage for igniting the lamp and a lower voltage for sustaining the ignition and therefore illumination of the fluorescent lamp. The ferro-resonant transformer during this latter mode of operation operates in the constant current portion of its operating curve unlike typical utilization of a ferro-resonant transformer for constant voltage applications. Thus, the high voltage output from the ferro-resonant transformer is only maintained until such time that the fluorescent lamp ionizes and ignites with automatic reduction of the output voltage and current to the lower voltage and current required for maintaining the fluorescent lamp ignited. This matching of the ferro-resonant transformer to the power requirements of the fluorescent lamp has the further advantage of providing the approximately ten watts of power needed to ignite a thirty or forty watt fluorescent lamp and the six watts of power needed to sustain this ignition, without the use of other electronic circuitry nor the use of substantial amounts of battery power as would otherwise occur with other types of transformers.

The emergency fluorescent pack also incorporates transfer circuitry interconnected to the switched and unswitched sources of utility AC power, the safety cradle, and the emergency power high frequency generating module. The transfer circuitry includes a relay having a coil which is maintained energized so long as the safety cradle switch is closed. Whenever the safety cradle switch opens, the relay coil de-energizes, opening the relay contacts which in turn disconnect the utility AC power from the fluorescent fixture ballast so as to de-energize the fluorescent fixture sockets.

The transfer circuitry also incorporates a transistor network associated with the safety cradle switch, the network providing for the activation and de-activation of the oscillator within the emergency power module so as to control the activation and de-activation of high frequency emergency power generation. The same transistor network senses utility AC power so as to activate the emergency power circuitry whenever the AC power fails as well as to de-activate the emergency power when AC power is present.

Furthermore, a combination testswitch/panel light is interconnected to the transfer circuitry for indicating to the user when normal utility AC power is present as well as to allow the user to simulate a power failure to thereby test the proper functioning of the emergency fluorescent pack.

The transfer circuitry also incorporates a low battery voltage disconnect circuit associated with the transistor network activating and de-activating the emergency power module. This low battery voltage network senses the battery pack voltage and causes the transistor network to de-activate the emergency power oscillator whenever the battery pack voltage falls below a predetermined level, typically 3 volts. This low battery voltage disconnect circuitry therefore prevents deep discharge of the battery pack and thereby extends the useful life of the batteries.

OBJECTS OF THE INVENTION

It is therefore a principal object of the present invention to provide a self-contained emergency lighting fluorescent pack which may be mounted in-line or alongside a standard rapid start fluorescent lamp used in conjunction with standard ballast fluorescent fixtures and accompanying standard fluorescent lamps;

Another object of the present invention is to provide a fluorescent pack of the above description incorporating a safety cradle for de-energizing the fluorescent pack and the associated electrical connections of the fluorescent fixture whenever the driven fluorescent lamp is not properly aligned with the fluorescent fixture, and, for in line mounting, the fluorescent pack;

Another object of the present invention is to provide a fluorescent pack of the above description capable of easy installation to existing fluorescent fixtures while providing for extended period emergency lighting during power outages, by mounting the pack outside of the ballast chamber of the fluorescent fixture;

Another object of the present invention is to provide a fluorescent pack of the above description operating at a high frequency during its emergency mode so as to ignite and sustain ignition of the fluorescent lamp without the need for heating the lamp filaments normally used in the lamp for igniting and maintaining the lamp in its illuminated state;

A further object of the present invention is to provide a fluorescent pack of the above description wherein a ferro-resonant transformer is utilized having output characteristics matched to the power requirements of the fluorescent lamp so as to insure ignition and sustainance of ignition of the fluorescent lamp while minimizing the amount of power delivered to the lamp and similarly minimizing the power losses of the electronic circuitry within the fluorescent pack to thereby maximize the duration of battery power;

Another object of the present invention is to provide a fluorescent pack of the above description having automatic transfer circuitry for switching the pack into its emergency mode when the utility voltage fails or falls below a predetermined level and also for disconnecting the battery pack from the remainder of the fluorescent pack when the battery pack voltage drops to a predetermined percentage of its nominal voltage, thereby preventing deep discharge of the battery pack;

An additional object of the present invention is to provide a fluorescent pack of the above description incorporating base drive circuitry to the main power switching transistors which eliminates the need for base drive resistors which would otherwise consume a substantial portion of the battery power.

Other objects of the present invention will in part be obvious and will in part appear hereinafter.

THE DRAWINGS

For a fuller understanding of the nature and objects of the present invention reference should be had to the following detailed description taken in conjunction with the accompanying drawings, in which:

FIG. 1 is a perspective view of the self-contained emergency lighting fluorescent pack according to the present invention mounted in-line with a fluorescent lamp of a standard fluorescent fixture, also showing in phantom the fluorescent pack mounted between two fluorescent lamps in its alternative method of mounting;

FIG. 1A is a perspective view of the emergency lighting pack mounted along the side of a standard commercial fluorescent fixture;

FIG. 1B is a perspective view of the emergency lighting pack mounted in the lamp area of a fluorescent fixture for U-shaped fluorescent lamps;

FIG. 2 is an exploded perspective assembly view of the fluorescent pack shown in FIG. 1 illustrating one of the removable end caps for use when the fluorescent pack is mounted in-line with a fluorescent lamp;

FIG. 3 is a perspective view of the safety cradle shown in the orientation in which it is mounted to the fluorescent fixture as shown in FIG. 1;

FIG. 8 is a schematic diagram illustrating the electrical connections between the fluorescent pack and the dual lamp ballast, fluorescent lamps, and utility power when the fluorescent pack is mounted in-line with a fluorescent lamp;

Figure 10A:
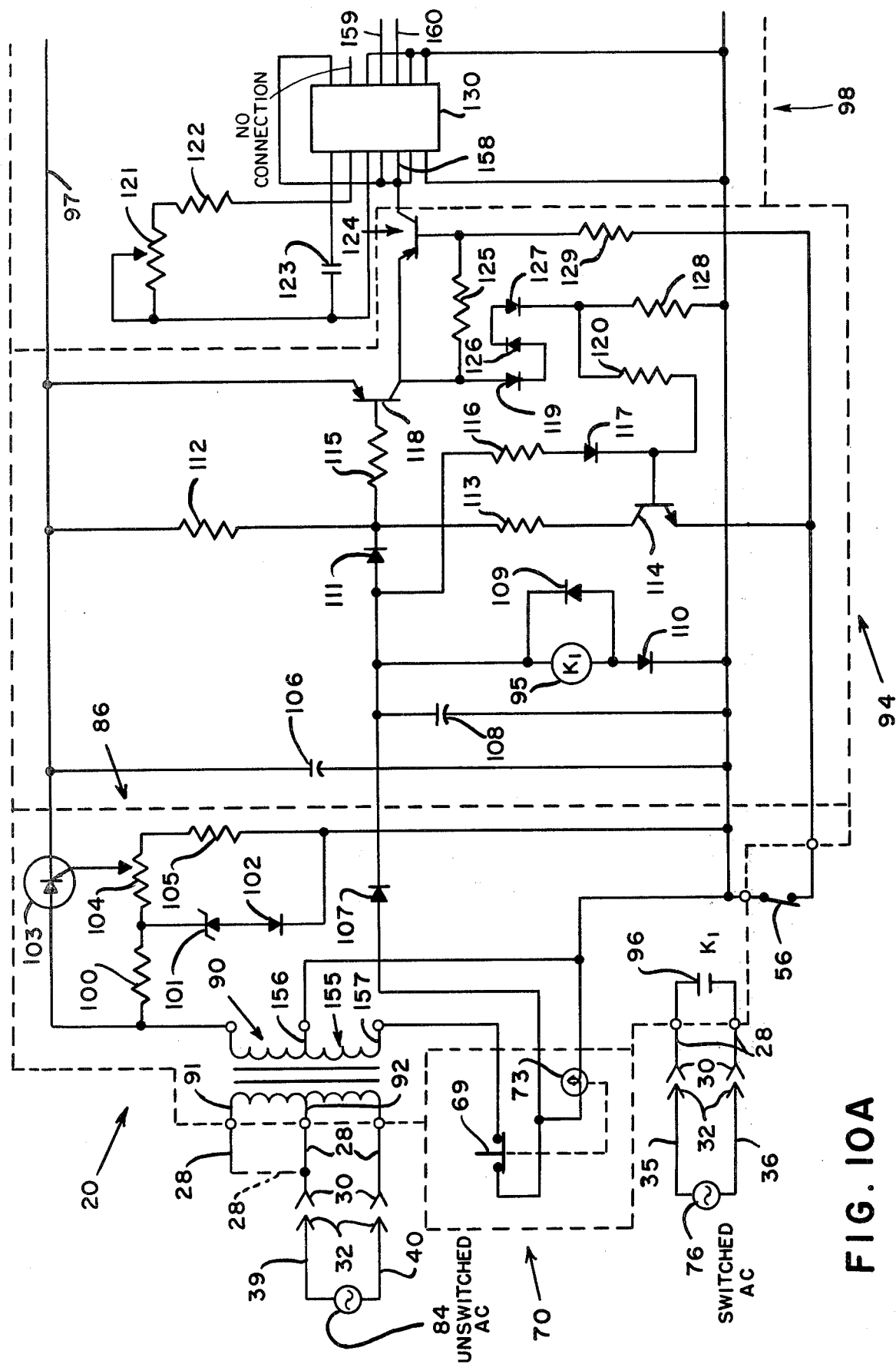

FIG. 9 is a schematic diagram of the electrical interconnections between the fluorescent pack and the ballast, fluorescent lamp, and utility power when the fluorescent pack is physically mounted alongside the fluorescent lamps, and also illustrating the interconnection of the fluorescent pack with one fluorescent lamp in a single lamp ballast arrangement, the portion within the dotted line being considered omitted;

FIG. 10A is a schematic diagram of a portion of the electrical circuitry of the fluorescent pack according to the present invention;

FIG. 10B is a schematic diagram of the remaining circuitry of the present invention;

FIG. 10C is a diagram showing how FIGS. 10A and 10B are put together; and

FIG. 11 is a diagrammatic view of the shape of the ferro-resonant transformer and the windings placed thereon.

DETAILED DESCRIPTION

As best seen in FIGS. 1 through 5, an emergency lighting fluorescent pack 20 according to the present invention is a self-contained device capable of mounting in-line with a fluorescent lamp or tube 22 or nearby or alongside the fluorescent lamps 22 and 24. In the latter mounting configuration, the fluorescent lamp 22 which is operated by the fluorescent pack has a length equal to the length of the other fluorescent lamp 24. FIG. 1 illustrates the emergency pack installed beneath fixture reflective surface 25 and in-line with lamp 22. In phantom, the emergency pack is shown mounted beneath surface 25 and between lamps 22 and 24, in which case lamp 22 would have the same length as lamp 24. FIG. 1A illustrates pack 20 mounted to the side of fluorescent fixture 26 while FIG. 1B illustrates the emergency pack mounted to the fixture utilizing U-shaped lamps 22 and 24.

The present fluorescent pack is designed for use in a dual lamp ballast fluorescent fixture 26 commonly found in industrial, commercial and home workshop areas and incorporating fluorescent lamps with "rapid start" configurations. Although the fluorescent pack 20 is for use with rapid start lamps using a dual ballast electrical configuration, it is known that single and three lamp ballast configurations of some manufacturers can be properly driven by the present invention.

Electrical connections are made between the fluorescent pack 20 and the fluorescent fixture 26 by means of an electrical harness 28 having a polarized plug 30 interconnected with mating polarized plug 32 of a ballast and utility AC connection harness 34. The connection harness 34 comprises a number of wires 35, 36, 37, 38, 39 and 40 which are color coded for facilitating installation of the device with the dual ballast 42 and utility AC 76 and 84 (see FIGS. 8 and 9) within the fluorescent fixture 26. All dual lamp ballasts for rapid start fluorescent lamps are color coded as shown for wires 81, 82, 83 and 85 emanating therefrom. These wires connect with the circuit elements comprising ballast 42 as shown in FIGS. 8 and 9.

Figure 4:
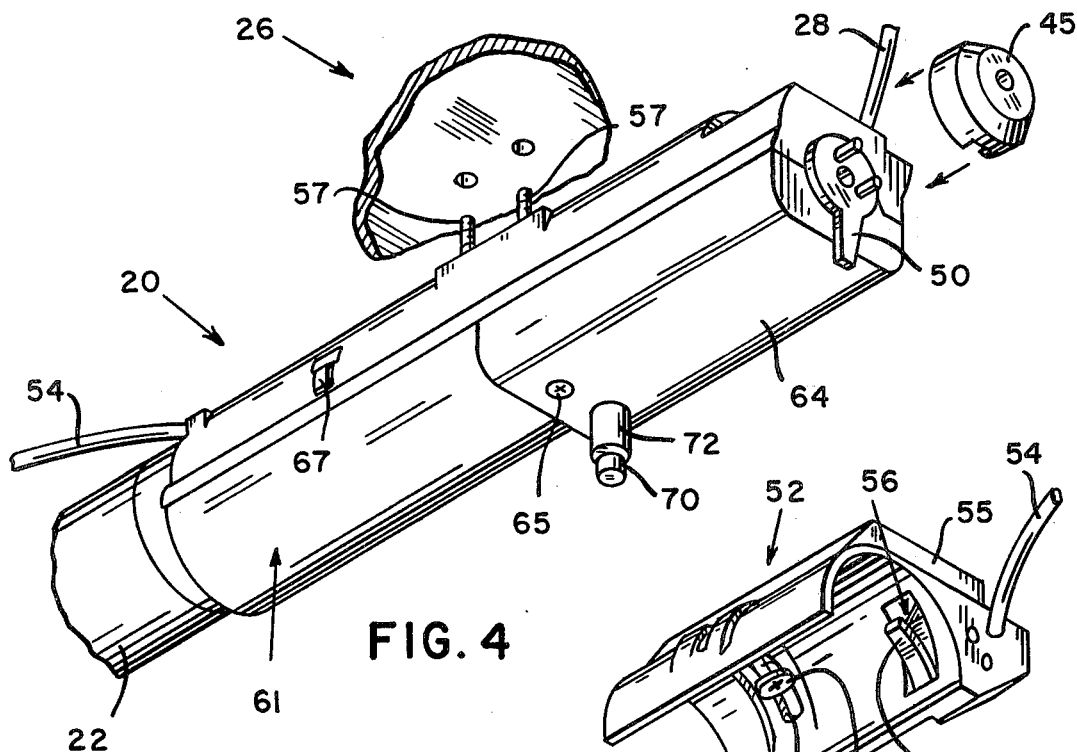
FIG. 4 is a partially cutaway perspective view of the fluorescent pack with its cover in place and mounted in-line with a fluorescent lamp.

As best seen in FIGS. 1, 2 and 4, when the fluorescent pack is mounted in-line with fluorescent lamp 22, end caps 44 and 45 are removed from the fluorescent pack in order to make electrical interconnections with lamp 22 and fluorescent fixture socket 46. Removal of end cap 44 exposes a female bi-pin socket 48 similar to the fluorescent fixture socket 46. Instead, the bi-pins at one end of lamp 22 are electrically and physically secured to the bi-pin fluorescent socket 48 of fluorescent pack 20. Socket 48 is angularly positionable by machine screws 33 so as to have an insertion entrance angle for the lamp equal to the entrance angle of fixture socket 47'. The other end of fluorescent pack 20, with the removal of end cap 45, exposes adjustable male bi-pins 50 which are physically and electrically secured to the fluorescent fixture socket 46. These pins are adjustable to facilitate insertion of the pins in socket 46, while maintaining the pack in a set orientation to the fixture.

Thus, when the fluorescent pack is mounted in line with a fluorescent lamp 22, a length of the fluorescent fixture 26 which would normally be occupied by a longer fluorescent lamp, such as fluorescent lamp 24, is occupied by the fluorescent pack, with the remainder of the length occupied by a smaller fluorescent lamp 22. In the preferred embodiment of the present invention, the fluorescent pack 20 has a length of one foot while the in-line fluorescent lamp 22 has a length of three feet. This gives an overall length of four feet which is the normal length for a 40 watt fluorescent lamp 24. The three foot fluorescent tube 22 has a typical wattage rating of 30 watts.

Due to the higher voltages generated by the fluorescent pack when it is operating in its emergency mode, and in order to minimize any shock hazard when a shorter than normal lamp is operated by either the utility AC or the pack, a safety cradle 52 is electrically interconnected with the fluorescent pack 20 via cable 54. The safety cradle insures the proper alignment of the fluorescent lamp 22 driven by pack 20.

Figure 5:
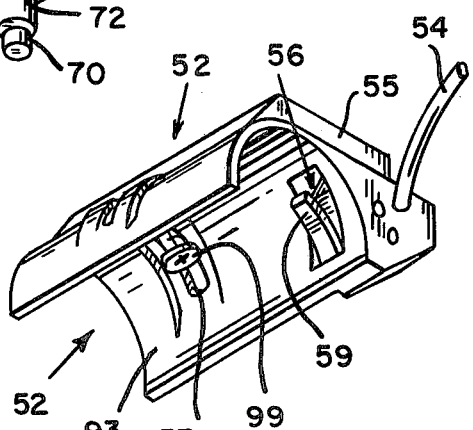
FIG. 5 is a perspective view of the safety cradle viewed in the same orientation as the fluorescent pack shown in FIG. 4 and illustrating the microswitch mounted within the safety cradle.

As best seen in FIGS. 3 and 5, the safety cradle has a concave configuration substantially identical to the outer configuration of the fluorescent lamp and is mounted to the fluorescent fixture 26 at a point which insures proper alignment of lamp 22 to fixture 26 and pack 20 when it sits within safety cradle 52.

When the fluorescent lamp is properly aligned, which in the case of the in-line mounting of the present invention is actually facilitated by the safety cradle 52, a microswitch 56 (see FIG. 5) with a depending lever 59 normally extending within the concave recess of the safety cradle 52 is electrically closed by the fluorescent lamp 22 thereby enabling the remainder of the fluorescent pack to operate the lamp in both normal and emergency mode operations (to be discussed later). Whenever lamp 22 is not properly aligned within the safety cradle, which condition would occur during normal replacement of the lamp 22, the lever 59 causes the microswitch 56 to be in the electrically open state. This electrical state is sensed by the remainder of the fluorescent pack 20 which in turn de-energizes the electrical connections within the female bi-pin fluorescent socket 48 as well as the fluorescent fixture socket 46 to which the fluorescent fixture socket 46 to which the fluorescent pack 20 interconnects as well as the remaining fluorescent fixture sockets 47 to which the fluorescent lamps 22 and 24 electrically and physically interconnect. In this manner, no shock hazard exists during normal maintainance of the fluorescent pack 20 and for replacement of fluorescent lamp 22 operated by fluorescent pack 20. Furthermore, the safety cradle 52 insures the de-energization of the fluorescent fixture sockets 46 and 47 regardless of the mounting configuration of the fluorescent pack; that is, regardless of whether it is mounted in line or alongside the fluorescent lamp 22.

As shown in FIG. 5, the safety cradle 52 incorporates a base interlock 87 having mounting holes 89 through which machine screws (not shown) pass and are locked in place by nuts (not shown). A cradle portion 93 has a curved slot 53 for positioning and mounting the cradle to the base interlock by machine screw 99.

Slot 53 allows the cradle to be positioned with its opening at any desired angle within approximately plus or minus 50° of the axis normal to the base interlock. This allows the cradle opening to be positioned so that the lamp 22 when positioned to mate with sockets 47 and 48 also will seal itself within cradle 93. The safety cradle therefore facilitates installation of the lamp in addition to deenergizing the pack and fixture sockets when the lamp 22 is not properly in place.

Figure 6:
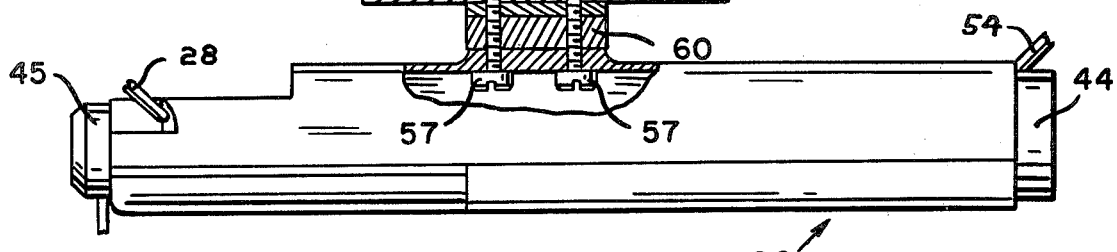
FIG. 6 is a partially cutaway cross-sectional side elevational view of the fluorescent pack illustrating its mounting to a fluorescent fixture.

This safety cradle is mounted to the fluorescent fixture 26 with the use of standard metal screws and nuts (not shown) passing through two mounting holes 87. Shims 55 may be placed between the base interlock and the upper inside surface of the fixture 26 in order to properly space the safety cradle therefrom. The shims preferably have a range of thickness for facilitating a desired spacing. The remainder of the fluorescent pack 20 is also mounted to the fluorescent fixture 26 by any standard fastening means such as machine screw and nut arrangement 57 and 58 (see FIGS. 2, 4 and 6). These screws are preferably spaced on opposite sides of the pack's center of gravity in order to minimize torque loading on socket 48. Shims 60, similar to shims 55, are used to properly space the fluorescent pack from the upper inside surface of fixture 26 especially when the fluorescent pack is mounted in-line with fluorescent lamp 22.

As best seen in FIGS. 2 and 4, the fluorescent pack 20 has a housing 61 incorporating a base 62 and a cover 64 removably interfitted with base 62 by a captive machine screw 65. The base and cover are preferably fabricated from a light colored flame retardant thermoplastic to insure proper operation of the fluorescent pack even in times of fire. The base and cover also have a rounded shape as shown in FIGS. 2 and 4 in order to minimize the shadow effect of the pack when mounted in-line with a shorter fluorescent lamp as well as to facilitate installation of the pack in fixtures with curved reflective surfaces.

As also seen in FIG. 2, the present invention incorporates a battery pack 66 held within base 62 by means of strap 67. The battery pack preferably comprises sealed lead cell batteries 88 (see FIG. 10B) with an output voltage for the pack of approximately four volts. Other rechargeable batteries such as nickel-cadmium and gel-cells may be used. Since the pack 20 is not mounted within the hot ballast channel 63 of fixture 26, the life of the battery pack is greatly extended.

The fluorescent pack also incorporates electronic circuit boards 68 which form the battery charger, transfer circuitry, and emergency power generating portions of the fluorescent pack. A combination testswitch/pilot light 70 extends downwardly from the fluorescent pack through an aperture 71 in cover 64. The testswitch/pilot light 70 has an adjustable collar 72 which provides for the downward extension of the testswitch/pilot light so as to make contact with the inside surface of the translucent fluorescent fixture lens or diffuser 74 (see FIG. 1) when the lens is in the closed position. Thus, the observer can see a faint glow of the pilot light through the lens which indicates that normal charging of the battery pack is occurring and he or she may push up against the fluorescent fixture lens so as to activate the testswitch which then indicates to the observer if the fluorescent pack can operate the fluorescent lamp during emergency conditions. Therefore, testing and observing the operating condition of the fluorescent pack is possible without the need for opening the fluorescent fixture lens 74. Since the components of the pack mount within the base 62, the cover 64 may be removed for battery maintenance without disturbing other components and without removing the pack from the fluorescent fixture.

As best seen in FIGS. 8 and 9, the electrical interconnections between the fluorescent pack 20 and the ballast 42 of the fluorescent fixture 26 as well as the utility line voltage is accomplished through connection harness 28 and ballast and utility AC harness 34. When the fluorescent pack is mounted in-line with fluorescent lamp 22, the electrical interconnections shown in FIG. 8 are utilized. That is, brown wires 35 and 36 of harness 34 are respectively connected to the black wire 77 of switched alternating current source 76 and the black wire 80 of ballast 42. The fluorescent lamp 22 selected for interconnection with the fluorescent pack 20 must have blue wires 81 and 82 at one end thereof within the fluorescent fixture 26. This is due to the color coding utilized by the industry with respect to dual ballast fluorescent lamp fixtures which insures that inductive windings 41 and 43 are across lamp 22 rather than series start capacitor 78 which is across lamp 24. Capacitor 78 would prevent the pack 20 from operating properly in the emergency mode due to the capacitor's low impedance at the 11 kilohertz operating frequency of pack 20. The inductive windings 41 and 43 present a high impedance at 11 kilohertz and therefore little power drain on pack 20.

The remaining fluorescent lamp 24 which is not energized by the fluorescent pack 20 will have red fixture wires 83 at one end and yellow fixture wires 85 at the other end, as shown in FIG. 8. Blue wire 37 of harness 34 is connected to blue wire 82 within fluorescent fixture 26. Finally, black wire 39 and white wire 40 of harness 34 are respectively connected to the black and white wires of an unswitched AC source 84. The yellow wire 38 of harness 34 is left disconnected for it is only used when the pack 20 is mounted nearby lamp 22.

This unswitched source of utility AC is the same as switched utility AC 76 except that the unswitched source remains activated even if utility AC 76 is switched off. That is, utility AC 76 allows lamps 22 and 24 to be turned on and off while utility AC 84 continues to supply power to emergency pack 20.

As seen in FIG. 9, the electrical connection between the fluorescent pack 20 and the ballast 42, the switched AC source 76 and the unswitched AC source 84 is the same as for the in-line mounting installation except that yellow wire 38 of harness 34 is connected to one of the yellow wires 85 from ballast 42 interconnected with fluorescent fixture socket 46. If the pack is used with a single lamp ballast, the interconnections are the same as those shown in FIG. 9, deleting lamp 24 and the respective wires enclosed by dotted line 79.

As best seen in FIGS. 10A and 10B, the electrical circuitry of the fluorescent pack 20 contains a constant potential temperature compensated battery charger 86 of standard design capable of recharging battery pack 66 in approximately twelve hours. The battery charger 86, as well as the remaining circuitry shown in FIGS. 10A and 10B, have circuit component values as set forth in Table II. It should be noted that line transformer 90 has two hot primary taps 91 and 92 respectively for interconnection with 277 VAC and 120 VAC unswitched utility line voltage. In this manner, the fluorescent pack is capable of installation in any Table 2

| Reference No. | Component | Value (or Component Code) |
|---|---|---|
| 91 | Line Transformer | 120 and 277 VAC primary windings |
| 95 | Relay Coil | |
| 96 | Relay Contacts | |
| 100 | Resistor | 270 ohm |
| 101 | Zener Diode | 1N752 |
| 102 | Diode | 1N4001 |
| 103 | SCR 1 | C106Y1 |
| 104 | Resistor | 2 K |
| 105 | Resistor | 3 K |
| 106 | Capacitor | 1000 uf at 16V |
| 107 | Diode | 1N4001 |
| 108 | Capacitor | 220 uf at 16V |
| 109 | Diode | 1N4001 |
| 110 | Diode | 1N4001 |
| 111 | Diode | 1N4001 |

Table 2-continued

| Reference No. | Component | Value (or Component Code) |
|---|---|---|
| 112 | Resistor | 10 K |
| 113 | Resistor | 10 K |
| 114 | Transistor | 2N4124 |
| 115 | Resistor | 1 K |
| 116 | Resistor | 10 K |
| 117 | Diode | 1N4001 |
| 118 | Transistor | 2N4125 |
| 119 | Diode | 1N4001 |
| 120 | Resistor | 10 K |
| 121 | Resistor | 10 K |
| 122 | Resistor | 10 K |
| 123 | Capacitor | .0012 uf |
| 124 | Transistor | 2N4125 |
| 125 | Resistor | 10 K |
| 126 | Diode | 1N4001 |
| 127 | Diode | 1N4001 |
| 128 | Resistor | 100 ohm |
| 129 | Resistor | 10 K |
| 130 | Integrated Circuit | CD4047AE (RCA) |
| 131 | Diode | 1N4001 |
| 132 | Transistor | D44H2 (G.E.) |
| 133 | Transistor | HS 5307 (G.E.) |
| 134 | Resistor | 100 ohm |
| 135 | Capacitor | 220 uuf |
| 136 | Capacitor | 220 uuf |
| 137 | Diode | 1N 4446 |
| 138 | Resistor | 22 K |
| 139 | Resistor | 22 K |
| 140 | Diode | 1N 4446 |
| 141 | Ferro-resonant Transformer | |
| 142 | Transistor | HS 5307 (G.E.) |
| 143 | Transistor | D44H2 (G.E.) |
| 144 | Resistor | 100 ohm |
| 145 | Diode | 1N4001 |
| 146 | Capacitor | 3900 PF. |
| 147 | Capacitor | .01 uf at 1KV | fluorescent fixture regardless of the unswitched line potential available. The connection harness 28 has wires connected to each tap 91 and 92. Only the one desired is interconnected with polarized plug 30.

The transfer circuitry module 94 of the electronic circuit of the emergency lighting fluorescent pack 20 is best seen in FIG. 10A. This portion performs the transfer of power from the normal utility AC to the battery pack 66 when a utility power outage occurs as well as to transfer power back to the utility AC when power returns. The transfer circuitry also removes battery power from driving fluorescent lamp 22 if the battery voltage drops below a predetermined level. This low voltage battery interrupt portion of the transfer circuitry prevents the batteries 88 from encountering a deep discharge which for most batteries is highly detrimental to their further use.

The last portion of the electronic circuitry, as best seen in FIGS. 10A and 10B, is the emergency power generating module 98. This module, when activated by the transfer circuitry module, produces high frequency and high voltage alternating current to ignite fluorescent lamp 22 and a high frequency, lower voltage, current controlled alternating current to maintain the lamp in the ignited state.

As best seen in FIGS. 8 and 10B, when the fluorescent pack 20 is mounted in-line with fluorescent lamp 22, the fluorescent fixture female socket 46 interconnects with adjustable male bi-pins 50 while female bi-pin fluorescent socket 48 of pack 20 interconnects with the male bi-pins 49 at one end of fluorescent lamp 22. The female socket 48 and male bi-pins 50 of the emergency pack electrically interconnect by wires 51 and 75. Thus, the AC power supplied to the fluorescent fixture socket 46 is simultaneously applied to the fluorescent lamp 22 if the switched utility AC source 76 is electrically connected to ballast 42. This connection occurs if relay contacts 96 (FIG. 10A) are closed. Relay contacts 96 are closed if relay coil 95 is energized. This energization of relay coil 95 occurs if utility unswitched AC power 84, as sensed by secondary winding 155 of line transformer 90, is present and if switch 56 of safety cradle 52 is closed, thus indicating that fluorescent lamp 22 is properly installed.

Whenever utility power 84 fails or safety cradle 56 opens, coil 95 de-energized, opening relay contacts 96 and thus disconnecting the switched AC power from ballast 42. As best seen in FIG. 8, this disconnection of AC power to ballast 42 in turn disconnects all utility power from fluorescent lamps 22 and 24. However, as will be explained more fully later, emergency power generating module 98 is energized if saftey cradle switch 56 is closed and a utility power outage from AC source 84 occurs, thus energizing the outputs 148, 149, and 150 of ferro-resonant transformer 141. Output 148 is coupled to bypass capacitor 147 which in turn is connected to output 151. Output 151 in turn is connected to the blue wire 37 of harness 34 and interconnects with blue wire 82 forming one of the contacts of fluorescent fixture socket 47. Likewise, output 149 interconnects with one of the male bi-pins 50 of the fluorescent pack 20 which in turn interconnects with one of the female pins 46 associated with fluorescent lamp 22. Finally, output 150 is connected to yellow wire 38 of harness 34. Therefore, outputs 150 and 151 drive lamp 22 when pack 20 is mounted alongside the lamps and outputs 149 and 151 drive lamp 22 when pack 20 is mounted in line with the lamp.

It should be noted that when normal AC power is present, this power is not impressed upon the outputs of the fluorescent pack 20 since output 148 is effectively isolated from the sixty hertz low frequency power by bypass capacitor 147. This capacitor at 60 hertz presents a high impedance, thus effectively isolating ferro-resonant transformer 141 from the utility AC power. However, during emergency operation when inverter 141 is energized, bypass capacitor 147, due to the high frequency of ferro-resonant transformer 141 presents a low impedance, thus allowing energization of the fluorescent lamp. The value of capacitor 147 must be selected so as to not adversely affect the inductive reactance of ballast 42, which reactance is necessary for limiting the current flow in lamps 22 and 24 during normal operation. In this emergency mode, the ballast 42 presents a high impedance to the emergency outputs due to the impedance of windings 41 and 43 at high frequencies. Therefore, although the ballast is interconnected with the output of the power pack, this interconnection does not adversely load the power pack during emergency mode operation.

Similarly, when the emergency lighting fluorescent pack 20 is interconnected in its side-by-side configuration to fluorescent lamp 22, the pack allows for normal utility AC power 76 to drive fluorescent lamps 22 and 24 when such utility power is present and to switch power to the fluorescent pack 20 to illuminate fluorescent lamp 22 during power outages. The operation of coil 95 and contacts 96 in conjunction with AC utility power 76 is identical in this mounting configuration as it is in the "in-line" mounting configuration. However, in the side-by-side mounting configuration, the normal utility power is interconnected with fluorescent lamp 22 directly across fluorescent fixture socket 46 and 47, without the intermediate connection between female fluorescent socket 48 and male bi-pins 50 of fluorescent pack 20 (see FIG. 10B). Likewise, during power outages, the female fluorescent socket 48 of the pack 20 is not interconnected with the male pins 49 at one end of fluorescent lamp 22. However, not only is the blue output wire 37 interconnected with output 151 but also the yellow wire 38 is interconnected with the output 150. As best seen in FIG. 9, this in turn provides energizing power to fluorescent lamp 22 during emergency mode operation.

Electrical Operation of the Emergency Lighting Fluorescent Pack

The transfer circuitry module 94 is responsible for all switching interconnections between the fluorescent pack 20 and the fluorescent lamps 22 and 24 as well as ballast 42 and switched AC utility power 76.

Secondary winding 155 of line transformer 90 has output terminals 156 and 157. Output terminal 157 interconnects to transfer circuitry module 94 via combination testswitch/pilot light 70 while common output terminal 156 directly interconnects with the transfer circuitry module and the negative output of battery pack 66.

As best seen in FIG. 10A, the output of secondary winding 155 is halfwave rectified by diode 107 charging capacitor 108 to approximately 10 volts. Charged capacitor 108 maintains the voltage at the cathode of diode 111 at a value greater than the 4 volt output of battery pack 66 on positive output line 97. The cathode voltage of diode 111 is applied to the base-emitter junction of PNP transistor 118 via resistor 115; thereby maintaining the PNP transistor 118 in the non-conducting state. The collector output of transistor 118 is coupled to the emitter of a second PNP transistor 124. Since transistor 118 is in the non-conducting state, collector current flow is not possible through transistor 124. The collector output of transistor 124 is interconnected with the inverter module 98 which generates the high frequency emergency power for fluorescent lamp 22.

More particularly, the collector output of transistor 124 is interconnected to an oscillator activating input 158 of oscillator integrated chip 130. Therefore, if transistor 124 is in the non-conducting state, oscillator chip 130 is prevented from oscillating, thereby de-energizing the remaining portion of the emergency power inverter module 98.

If the unswitched AC utility power 84 fails, capacitor 108 cannot be maintained in its charged state, discharging through coil 95 and diode 110 as well as through the series combination of resistor 113 and transistor 114 and the series combination of resistor 116, diode 117, resistor 120, and resistor 128. Once the voltage across capacitor 108 falls to a point so that the cathode voltage of diode 111 is less than the output voltage of battery pack 66, transistor 118 can no longer be maintained in the non-conducting state. Therefore, collector current through transistor 118 begins to flow both to transistor 124 as well as diodes 119, 126 and 127 to resistor 120 biasing the base of transistor 114. This latter current flow further energizes transistor 114 into its conducting state, thereby reducing the cathode voltage of diode 111. This reduction in cathode voltage causes more base current to flow through resistor 115 and thereby further causes transistor 118 to further conduct, until the transistor is clamped into full saturation. Thus transistors 118 and 114 comprise what is known as a regenerative transistor pair.

When transistor 118 conducts, transistor 124 is caused to enter the conducting state since the emitter voltage is greater than the base voltage due to biasing resistor 125. Once transistor 124 enters the conducting state, the oscillator activating input 158 is energized thereby causing oscillator integrated chip 130 to begin oscillating and consequently driving the remaining portion of the emergency power generating module 98.

As explained earlier, normal unswitched AC power 84 causes the secondary side of line transformer 90 to be energized which in turn causes coil 95 to be energized, thus closing contacts 96 associated with the switched AC power 76 interconnected to ballast 42. However, if safety cradle switch 56 is open, an electrical path from secondary outputs 156 and 157 of line transformer 90 is broken, thereby deenergizing fluorescent sockets 46 and 47 associated with both fluorescent lamps 22 and 24 (see FIGS. 8 and 9). Switch 56, when open, also prevents transistor 124 from conducting collector current since no base current can pass through resistor 129 to center tap terminal 156. Transistor 124 is therefore turned off preventing the emergency power generating module 98 from energizing fluorescent lamp 22. Therefore, not only are the fluorescent fixture sockets 46 and 47 de-energized but also the power pack outputs 37, 38, 48 and 50 are de-energized. This de-energization ensures that a user may change or adjust fluorescent lamps 22 or 24 without fear of electrical shock.

Similarly, coil 95 is de-energized if push-button switch 69 of the combination testswitch/pilot light 70 is depressed, as would be done manually in order to ascertain if the pack 20 is operating properly. The opening of pushbutton switch 69 however does not prevent the emergency power generating module 98 from operating, as does the opening of safety cradle switch 56, since base resistor 129 is not disconnected from center tap 156. Therefore, when pushbutton switch 69 is depressed, fluorescent lamp 24 becomes de-energized while fluorescent lamp 22 is energized by the fluorescent pack 20. Since the output of fluorescent pack 20 is at a level below that driving fluorescent lamp 22 when normal AC power is present, the operator can quickly ascertain if the power pack is operating properly by noting that the lamp 22 is illuminated at a reduced level and that lamp 24 is not illuminated. Release of pushbutton switch 69 causes it to again electrically close the secondary outputs 156 and 157 of winding 155 with coil 95 thereby energizing fluorescent lamps 22 and 24 by the AC power 76. Further, when pushbutton switch 69 is closed, light 73 of combination testswitch/pilot light 70 is energized by the secondary outputs 156 and 157 of line transformer 90. This indicates to the observer that normal unswitched AC power is being supplied to the fluorescent pack 20 which in turn signifies that battery charger module 86 is properly operating and charging battery pack 66.

Another function of the transfer circuitry module 94 is to prevent battery pack 66 from de-energizing to a state where batteries 88 are in a condition of deep discharge. In order to prevent this, the transfer circuitry module 94 senses the output voltage of battery pack 96 and de-energizes emergency power output module 98 when this sensed battery pack voltage is below a predetermined level. This function of the transfer circuit module 94 is accomplished primarily by transistor 118 in conjunction with diodes 119, 126, and 127, resistors 120 and 128 and transistor 114. Due to the forward current voltage drop across the series connected diodes 119, 126 and 127, current flow from the emitter to the collector of transistor 118 is only permissible if the voltage at the collector of transistor 118 is above the forward voltage drop across diodes 119, 126 and 127 as well as the forward emitter to base voltage drop across transistor 114. The forward voltage drop across the diodes 119, 126 and 127 is such that transistor 118 is forced into the non-conducting state if the battery pack voltage falls below three volts. At this time, current flow is no longer possible to transistor 124 since transistor 114 enters the non-conducting state which effectively prevents emitter-base current through transistor 118. With transistor 118 off, transistor 124 is turned off, thus de-activating oscillator chip 130.

The emergency power generating module 98 is designed to provide high frequency power to fluorescent lamp 22 during emergency mode operation in order to ignite the lamp and maintain the lamp in its ignited state for as long as battery pack voltage 66 is above the approximately three volt level spoken of earlier with respect to the low voltage battery disconnect portion of transfer module 94. The fluorescent lamp 22 used with the present invention is the standard rapid start fluorescent lamp which normally uses filament heater windings installed therein to generate free electrons which allow for ionization of the lamp at 60 hertz and approximately 120 volts. However, in the emergency mode operation, it is desirable from an energy conservation point of view not to heat the heater filaments. If the filaments are not heated, it is necessary to have between 300 and 600 VRMS in order to start ionization of the lamp. Once ionization has occurred, the lamp operating voltage drops to approximately 120 VRMS and is fairly independent of lamp current. The power necessary to ignite the tube at the 300 to 600 VRMS level is typically 10 watts while the power to sustain ionization is approximately 5 watts.

The emergency power module generates its 11 kilohertz signal initiated by oscillator integrated circuit 130 when energized by the collector output of transistor 124. This oscillator integrated circuit chip is preferably a CMOS multi-vibrator chip with true symmetrical outputs on output lines 159 and 160. The frequency of oscillation is governed by variable resistor 121 in series with resistor 122, their series combination in parallel with capacitor 123. The preferable frequency for driving the lamp is 11 kilohertz. The signals on output lines 159 and 160 are symmetrical in order to eliminate any DC bias on the accompanying circuit components.

Output line 159 through resistor diode parallel combination 139 and 140 and capacitor 136 drive the base of transistor 142 while output line 160 similarly drives the base of transistor 133 through diode resistor parallel combination 137 and 138 in parallel combination with capacitor 135. The collector current of transistors 133 and 134 when energized is obtained from battery packs 66 through primary windings 162 and 163 of ferro-resonant transformer 141. In this manner, battery power is conserved by eliminating the need for collector current limiting resistors. Thus, the collector current through transistors 133 and 142 which in turn provide for the base current drive for switching transistors 132 and 143 respectively provide for additional primary magnetic excitation of ferro-resonant transformer 141 instead of having a portion of the current dissipated in the form of heat across current limiting collector resistors.

As previously mentioned, switching transistors 132 and 143 are driven by driving transistors 133 and 142 respectively and provide the majority of the primary current to the ferro-resonant transformer 141 through primary windings 164 and 165 respectively. These current pulses in conjunction with the current pulses generated through primary windings 162 and 163 — the latter pulses occurring virtually simultaneously with those pulses passing through windings 165 and 164 respectively — provide for the excitation of ferro-resonant transformer 141. The secondary of ferro-resonant transformer 141 generates a high frequency, high voltage sinusoidal output across secondary windings 166 and 167 which in turn are respectively delivered to fluorescent lamp 22 when the pack is mounted in the side-by-side or "in-line" configuration.

As best seen in FIG. 11, the ferro-resonant transformer 141 utilizes a core comprising two E-shaped halves 175 facing each other. The center leg 176 of each E-shaped half combines to form a magnetic shunt having an air gap of approximately 0.075 inches therebetween. The core material used in the preferred embodiment was a Type 77 proprietary composition manufactured by Fair-rite Products Corporation, of Wallkill, N.Y. This core material is generally described in two publications of Fair-Rite Products, Inc.; namely, "Specifications and Characteristics of 77 Fair-Rite Material", Revision A, dated Jan. 1976, and "Magnetic Properties of Fair-Rite Materials", dated Sept. 1974. These publications indicate that the material is a manganese-zinc ferrite core material.

Figure 7:
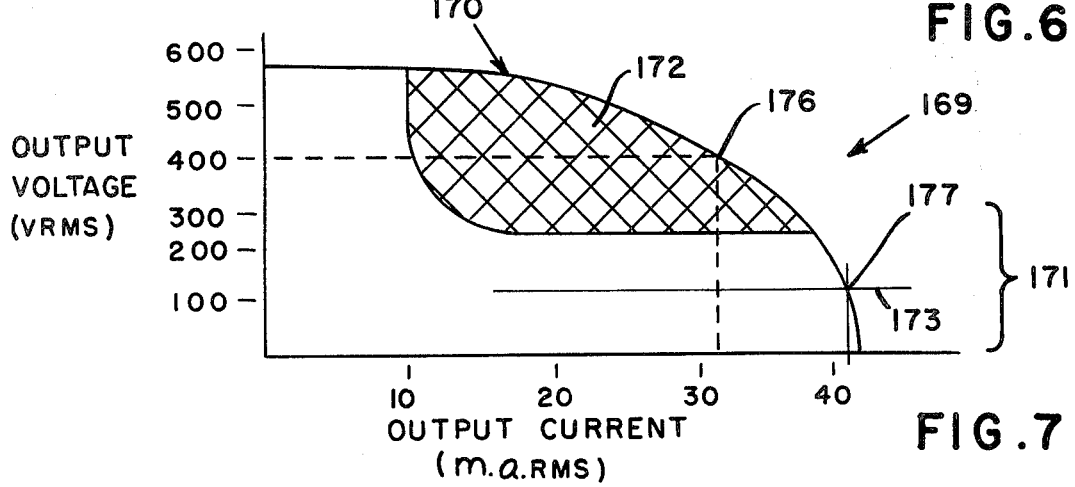
FIG. 7 is a voltage-current diagram showing the operating characteristics of the ferro-resonant transformer used in the fluorescent pack as well as the load line for an ignited fluorescent lamp.

Primary windings 162 and 164 each comprise ten turns of #20 wire, bifilar wound, while primary windings 163 and 165 each comprise five turns of #36 wire, bifilar wound. Secondary winding 166 comprises 475 turns of #36 wire and secondary winding 167 comprises 100 turns of #36 wire. This construction of the ferro-resonant transformer yields a transformer having an operating curve as shown in FIG. 7. Capacitor 146 resonates with winding 166 and drives ferrite section 168 (see FIG. 11) into deep saturation which generates the high voltage section 170 of transformer operating curve 169 (see FIG. 7). As also seen in FIG. 7, the operating curve 169 of ferro-resonant transformer 141 further has an approximate constant current portion 171.

The typical fluorescent lamp 22 when operated at a high frequency, such as 10 kilohertz, and without the use of the cathode filament within the lamp, requires between 300 to 550 V RMS at a power level of 7 to 11 watts and a duration of two to four seconds to ionize the lamp, the voltage and power variations depending upon the lamp length and lamp make. As seen in FIG. 7, once ionization has occurred, the voltage across the lamp drops to between 120 and 140 V RMS and is fairly independent of lamp current as indicated by load line 173.

The cross-hatched area 172 of FIG. 7 represents typical ionization volt-ampere products of various fluorescent lamps. Therefore, if a lamp requires 400 V RMS at 20 milliamperes to ionize, the ferro-resonant transformer operating curve 169 indicates that the transformer will have an output of 400 V RMS at 32 milliamperes. (point 176), and thus ionization of the lamp will occur.

The uniqueness of the ferro-resonant transformer utilized in the present invention is its power foldback capability between ionization of the fluorescent lamp and maintenance of this ionization. Thus, for the fluorescent lamp requiring 400 V RMS and 20 milliamperes to ionize, the power output of the ferro-resonant transformer at point 176 of operating curve 169 is 12.8 watts (0.032 amps × 400 V RMS = 12.8 watts). The same lamp, as shown by its load line 173, requires 120 V RMS at 41 milliamps to remain ionized (point 177). This converts to a power requirement of 4.92 watts in order to remain ionized.

Therefore, the ferro-resonant transformer is able to maintain the lamp in the lit or ionized state at a lower power dissipation once the lamp is ionized while providing the higher power output necessary to initially ionize the lamp. This result translates into a corresponding battery current drain foldback which is desirable for minimizing the size of the battery necessary for providing emergency lighting for a given period of time. In other words, the ferro-resonant transformer delivers a relatively high power level requiring high battery current during ionization of the lamp. Thereafter, the operating characteristic of the fluorescent lamp suppresses the ferro-resonant output causing a reduction in the output power of the transformer with a corresponding reduction in the battery current drain supplied to transistors 132, 133, 142 and 143. Consequently, the ferro-resonant transformer only demands high battery power during lamp ionization and thereafter low battery power for the duration of the maintenance of lamp ionization, which for most emergency lighting situations is no greater than 90 minutes. This feature reduces the size of the batteries yet delivers a significant amount of light emergency operations. Furthermore, the ferro-resonant transformer allows transistors 132, 133, 142 and 143 to be operated in the efficient switch-mode with resultant magnetic lamp ballasting. In addition, the operation of these transistors in the switch-mode minimizes transistor voltage drop and therefore permits the use of low battery pack output voltages, such as 4 volts.

Although a number of the cited prior art patents utilize ferro-resonant transformer, such as U.S. Pat. No. 3,946,301, their use of ferro-resonant transformers is typically at 60 hertz and for voltage regulation purposes. The present invention uses the ferro-resonant transformer at a high frequency to, 1) provide the high voltage necessary to ignite the lamp and 2) provide a current limiting ballast simulating function once the lamp is ignited so as to maintain the lamp in the ignited state without supplying too much current thereto.

Thus, the present invention provides for an emergency power fluorescent pack for providing emergency power to a fluorescent lamp during power outages, the fluorescent pack being mountable either in-line with the fluorescent lamp or in a side-by-side configuration thereto. The fluorescent pack of the present invention incorporates a ferro-resonant transformer for providing igniting voltage to the lamp and current limiting characteristics for maintaining the proper power dissipation in the lamp. The ferro-resonant transformer is driven by drive circuitry which utilizes the collector current of both the drive and switch transistors for providing primary current to the ferro-resonant transformer, thereby conserving battery power.

Furthermore, the fluorescent pack of the present invention incorporates a safety cradle interlock for preventing energization of the fluorescent fixture sockets when the fluoresecent lamp driven by the pack is not properly mounted within the fluorescent fixture. In addition, the transfer circuitry of the present invention provides for a disconnect of the battery pack from the inverter portion of the pack when the battery voltage drops below a predetermined level and thereby prevents the discharge of the batteries within the battery pack. Lastly, the fluorescent pack incorporates a combination testswitch/pilot light for indicating to the user when the fluorescent pack is operating normally as well as to test the fluorescent pack in its emergency mode.

It will thus be seen that the objects set forth above, among those made apparent from the preceding description, are efficiently and synergistically attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed is:

1. An emergency lighting fluorescent pack for use with fluorescent fixtures using one or more fluorescent lamps and a lamp ballast to operate the lamps when powered by a source of utility AC, comprising:
   (A) a housing mountable to the fluorescent fixture in a portion of the space normally used by one of the fluorescent lamps, having means for electrically connecting a fluorescent lamp to the fluorescent fixture socket adjacent the housing, said lamp having a length shorter than that normally used in the fluorescent fixture and able to be operated by the lamp ballast, the other end of the shorter lamp electrically connected to the opposite fixture socket, the housing having a length when combined with said shorter fluorescent lamp substantially equal to the length of fluorescent lamps normally used in said fluorescent fixture;
   (B) a battery pack incorporating one or more batteries;
   (C) a battery charger electrically connected to said battery pack for charging the batteries incorporated in said battery pack when normal utility AC power is present;
   (D) means, powered by said battery pack, for generating emergency power for illuminating said shorter fluorescent lamp;
   (E) means, interconnectable with said shorter fluorescent lamp and interconnected to the emergency power generating means, for providing the generated emergency power to said shorter lamp;
   (F) transfer circuitry interconnected to said battery pack and emergency power generating means having means for sensing utility AC power and for providing activation of said emergency power generating means when the utility AC power level falls below a predetermined level; and
   (G) means, interconnectable between unswitched utility AC power and said battery charger and transfer circuitry, for providing alternating current power to said battery charger and transfer circuitry;
whereby the emergency lighting pack allows utility AC to power the fluorescent lamps when the utility AC is operating normally and generates emergency electricity to power the shorter fluorescent lamp in an emergency mode operation when the utility AC falls below said predetermined level.

2. An emergency lighting fluorescent pack as defined in claim 1, wherein the shorter fluorescent lamp is a 30 watt rapid start lamp and the other lamps are 40 watt rapid start lamps.

3. An emergency lighting fluorescent pack as defined in claim 1, wherein the electrical connecting means of the housing incorporates male bi-pins at one end of the housing for interconnection with a female fluorescent socket of the fluorescent fixture electrically connected to the ballast, and a female fluorescent socket electrically connected to the male bi-pins mounted to the housing at its opposite end for interconnection with the male bi-pins at one end of the shorter fluorescent lamp.

4. An emergency lighting fluorescent pack as defined in claim 3, wherein the male bi-pins and female socket of the housing are angularly positionable with respect to the housing so as to facilitate installation of the housing to the fixture while maintaining the female socket entrance angle substantially equal to that of the corresponding fixture socket entrance angle to which the shorter fluorescent lamp interconnects.

5. An emergency lighting fluorescent pack as defined in claim 3, wherein the lamp ballast has at least one non-capacitive shunted output for operating one of the fluorescent lamps, wherein said shorter lamp and housing replace one of these non-capacitive shunted lamps, and wherein the means for generating emergency power to the shorter fluorescent lamp incorporates a high frequency oscillator, drive circuitry interconnected with said oscillator, and a ferro-resonant transformer having primary windings driven by said drive circuitry in conjunction with power supplied by said battery pack, so as to generate a high frequency sinusoidal output across its secondary winding, said output powering said shorter fluorescent lamp during emergency mode operation.

6. An emergency lighting fluorescent pack as defined in claim 5, wherein a high frequency bypass capacitor is mounted in series between one of the outputs of the ferro-resonant transformer and the means for providing said generated emergency power to the shorter fluorescent lamp for allowing high frequency AC power to drive the fluorescent lamp when the utility AC power falls below said predetermined level while preventing low frequency utility AC voltage from driving the secondary of the ferro-resonant transformer when normal utility AC power is present.

7. An emergency lighting fluorescent pack as defined in claim 5, wherein said oscillator operates at approximately 11 kilohertz; thereby making the inductive ballast of the fluorescent fixture act as a high impedance and consequently a negligible power drain to the emergency power generating means.

8. An emergency lighting fluorescent pack as defined in claim 7, wherein the secondary winding output of the ferro-resonant transformer has an operating curve with a high voltage portion and a constant current portion, the high voltage portion at a voltage substantially higher than the normal operating voltage of the fluorescent lamp driven by the emergency lighting pack so as to ignite said lamp without heating the filament windings within the lamp, and wherein the constant current portion of the operating curve drives the fluorescent lamp at a voltage approximately equal to its normal operating voltage and at a current level that provides a current limiting ballast simulating function to the driven lamp at a resultant power level less than that required for emergency lamp ignition, whereby the fluorescent lamp is ignited without the need for powering its filament windings and without the need for providing ballast for maintaining proper current flow through the lamp once ignited.

9. An emergency lighting fluorescent pack as defined in claim 7, wherein the secondary winding output of the ferro-resonant transformer has an operating curve defined by a smooth curve having values substantially corresponding to those in the following table:

| Output Current (milliamperes rms) | Output Voltage (volts rms) |
|---|---|
| 0 | 570 |
| 5 | 565 |
| 10 | 562 |
| 15 | 560 |
| 20 | 535 |
| 25 | 490 |
| 30 | 435 |
| 35 | 345 |
| 40 | 170 |
| 42 | 0 | so as to generate high voltage, high frequency power necessary to ignite the fluorescent lamp without heating the filament windings within the lamp and lower voltage, low current, high frequency power necessary to maintain ignition of the lamp while limiting the current flow within said lamp.

10. An emergency lighting fluorescent pack as defined in claim 5, wherein the ferro-resonant transformer incorporates four primary windings and wherein the oscillator has two symmetrical outputs and said drive circuitry incorporates a first pair of drive transistors respectively driven by the outputs of said oscillator, the collector currents of said drive transistors respectively passing through two of said primary windings, said transistors respectively driving a pair of switching transistors having their collector currents respectively passing through the other two primary windings; thereby providing for the energization of the primary windings of the ferro-resonant transformer by having the collector currents of both the driving and switching transistors pass through the primary windings, consequently minimizing power loss in the drive circuitry and extending the length of time that the battery pack can supply power to the fluorescent pack.

11. An emergency lighting fluorescent pack as defined in claim 3, wherein the means interconnectable with the shorter fluorescent lamp and interconnected to the emergency power generating means for providing the generated emergency power to the shorter lamp utilizes the female fluorescent socket of said housing for providing emergency power to the shorter lamp at one end thereof, and wherein said providing means further incorporates in conjunction with the means for providing alternating current power to the battery charger and transfer circuitry, a first electrical harness electrically connected to the fluorescent pack, a polarized connector at the other end of said harness, a second electrical harness, and a mating polarized plug connected to one end of the second harness for interconnection with the polarized plug of the first harness, said second harness incorporating electrical wires for, (1) interconnction to the ballast of the fluorescent fixture; and (2) interconnection to the fluorescent lamp driven by the emergency power fluorescent pack.

12. An emergency lighting fluorescent pack as defined in claim 3, wherein said housing further incorporates removable end caps for covering the male bi-pins at one end of said housing and the female fluorescent socket at the other end of said housing, whereby said housing may alternatively be mounted to the fluorescent fixture alongside a fluorescent lamp to be driven by the pack when the utility AC power falls below said predetermined level, wherein the means for providing the generated emergency power to the shorter fluorescent lamp further comprises means for providing generated emergency power to a lamp mounted between two female fluorescent sockets of the fluorescent fixture when the pack is mounted alongside said lamp; whereby the emergency lighting fluorescent pack may be mounted either in line with a fluorescent lamp to be driven or alongside a fluorescent lamp to be driven.

13. An emergency lighting fluorescent pack as defined in claim 12, further comprising:

(G) a safety cradle electrically interconnected with the transfer circuitry and physically intercommunicating with the fluorescent lamp operated by said fluorescent pack in its emergency mode, said safety cradle having means for detecting the placement of the fluorescent lamp within the safety cradle in a predetermined fashion which indicates that the lamp is properly installed in the fluorescent fixture, said transfer circuitry further having second means, electrically interconnected with said fluorescent lamp alignment means of the safety cradle for de-energizing the fluorescent sockets of the fluorescent fixture when said lamp is not aligned in said predetermined fashion within the safety cradle, and third means for preventing the activation of the emergency power generating means when the lamp is not aligned in said predetermined fashion within the safety cradle; thereby allowing for the de-energization of the fluorescent fixture during times when the fluorescent lamp driven by the emergency fluorescent pack is being installed or adjusted.

14. An emergency lighting fluorescent pack as defined in claim 1, further comprising:

(G) a safety cradle electrically interconnected with the transfer circuitry and physically intercommunicating with the fluorescent lamp operated by said fluorescent pack in its emergency mode, said safety cradle having means for detecting the placement of the fluorescent lamp within the safety cradle in a predetermined fashion which indicates that the lamp is properly installed in the fluorescent fixture and emergency pack, and said transfer circuitry further having second means, electrically interconnected with said fluorescent lamp alignment means of the safety cradle for de-energizing the fluorescent sockets of the fluorescent fixture when said lamp is not aligned in said predetermined fashion within the safety cradle, and third means for preventing the activation of the emergency power generating means when the lamp is not aligned in said predetermined fashion within the safety cradle; thereby allowing for the de-energization of the fluorescent fixture during times when the fluorescent lamp driven by the emergency fluorescent pack is being installed or adjusted.

15. An emergency lighting fluorescent pack as defined in claim 14, wherein said means for detecting the presence of the fluorescent lamp within said safety cradle incorporates a switch having a depending lever extending within the region where said fluorescent lamp is to be placed when it is properly installed within the fluorescent fixture.

16. An emergency lighting fluorescent pack as defined in claim 15, wherein said safety cradle has an elongated concave recess dimensioned similar to a longitudinal peripheral section of the fluorescent lamp driven by said fluorescent pack, wherein the depending lever of said switch extends within this elongated concave recess for detecting the proper alignment of the fluorescent lamp.

17. An emergency lighting fluorescent pack as defined in claim 14, wherein the transfer circuitry second means for de-energizing the fluorescent sockets of the fluorescent fixture comprises a relay having a coil and a pair of electrical contacts, said coil interconnected with the means for detecting the presence of the fluorescent lamp within the safety cradle, said relay contacts in series with at least one side of the utility AC power connected to the lamp ballast so as to open the relay contacts if said means for detecting the presence of the fluorescent lamp indicates that the lamp is not within the safety cradle in said predetermined fashion.

18. An emergency lighting fluorescent pack as defined in claim 17 further comprising:
   (H) a testswitch and pilot light, interconnected between the transfer circuitry and the means for interconnecting said transfer circuitry with unswitched utility AC power, for simulating a power failure in order to test the emergency mode operation of the emergency fluorescent pack as well as to indicate to the user via the pilot light when normal AC power is being supplied to the fluorescent pack.

19. An emergency lighting fluorescent pack as defined in claim 16, wherein the testswitch and pilot light are mounted in the same fixture, the testswitch having a pushbutton and the fixture depending downwardly from said housing to facilitate use of the testswitch by an operator.

20. An emergency light fluorescent pack as defined in claim 19, wherein the fluorescent fixture further comprises a translucent lens cover removably mounted beneath the fluorescent lamps, and wherein the amount said depending fixture housing the testswitch and pilot light extends is adjustable so that the termination of said testswitch/pilot light combination can contact the inside surface of the lens cover to the fluorescent fixture in order to allow the observer to see the condition of the pilot light through the lens cover and allow activation of the pushbutton testswitch without opening the lens cover.

21. An emergency lighting fluorescent pack as defined in claim 17, wherein the electrical connecting means of the housing incorporates male bi-pins at one end of the housing for interconnection with a female fluorescent socket of the fluorescent fixture electrically connected to the ballast, and a female fluorescent socket electrically connected to the male bi-pins mounted to the housing at its opposite end for interconnection with the male bi-pins at one end of the shorter fluorescent lamp, and wherein the means interconnectable with the shorter fluorescent lamp and interconnected to the emergency power generating means for providing the generated emergency power to the shorter lamp utilizes the female fluorescent socket of said housing for providing emergency power to the shorter lamp at one end thereof, and wherein said providing means further incorporates in conjunction with the means for providing alternating current power to the battery charger and transfer circuitry, and the interconnection of the relay contacts of the transfer circuitry second means to the utility AC power connected to the lamp ballast, a first electrical harness electrically connected at one end to the fluorescent pack, a polarized connector at the other end of said harness, a second harness, and a mating polarized plug connected at one end of the second harness for interconnection with the polarized plug of the first harness, said second harness incorporating electrical wires,
   (1) for interconnection to the ballast of the fluorescent fixture;
   (2) for interconnection to the fluorescent lamp driven by the emergency power fluorescent pack; and
   (3) for interconnection with the unswitched utility AC power.

22. An emergency lighting fluorescent pack as defined in claim 14, wherein the means of the transfer circuitry for sensing utility AC power and for providing activation of the emergency power generating means incorporates a first diode in series with a capacitor, said diode driven by the means for providing alternating current power to the transfer circuitry and charging said capacitor when the alternating current power is present, a second diode with its anode connected to the cathode of the first diode at the junction of the connection of the first diode with the capacitor, a first PNP transistor having a first base biasing resistor connected between the cathode of the second diode and the base of the first transistor, a second base biasing resistor connected between the cathode of the second diode and the positive output of the battery pack, and the base of the first transistor having its emitter electrically interconnected with the positive output of the battery pack, a second PNP transistor electrically connected to the collector output of the first transistor, having an output interconnected to the emergency power generating means so as to activate said generating means if said second transistor output is in the conducting state, and a base biasing resistor interconnected to the negative output of the battery pack, whereby when utility AC power is present the capacitor charges causing a voltage at the cathode of the second diode to be greater than the output voltage of the battery pack thereby biasing the first transistor into a non-conducting state so that the second transistor is also maintained in a non-conducting state thereby de-activating the emergency power generating means, and whereby when utility AC power falls below said predetermined level the capacitor discharges causing the cathode voltage of the second diode to fall below the output voltage of the battery pack thereby causing the first transistor to start conducting current which in turn causes the second transistor to start conducting current and thereby activating the emergency power generating means.

23. An emergency lighting fluorescent pack as defined in claim 22, wherein the transfer circuitry second means for preventing activation of the emergency power generating means incorporates electrical interconnection of the safety cradle switch to the base biasing resistor of the second transistor so as to prevent base biasing current therethrough regardless of the conducting state of the first transistor, thereby overriding activation of the transfer circuitry first means and thereby insuring de-energization of the fluorescent lamp sockets and the means interconnectable with the driven fluorescent lamp for providing emergency electrical power thereto, and consquently insuring no electrical shock hazard when changing or adjusting the driven fluorescent lamp.

24. An emergency lighting fluorescent pack as defined in claim 1, wherein the transfer circuitry further incorporates means for de-energizing said means for generating emergency power when the battery pack voltage falls below a predetermined level; thereby preventing deep discharge of said battery pack.

25. An emergency lighting fluorescent pack as defined in claim 24, wherein said means for de-energizing the emergency power generating means when the battery pack voltage falls below a predetermined level incorporates a series of diodes electrically interconnected with each other in cathode to anode relationship and interconnected with first and second switching devices so that the second switching device prevents the first switching device from activating the emergency power generating means when the battery voltage approximately equals the forward voltage drop across the series connected diodes.

26. An emergency lighting fluorescent pack as defined in claim 25, wherein the switching devices are transistors, the second transistor preventing base current flow in the first transistor when the battery voltage falls below said predetermined level.

27. An emergency lighting fluorescent pack as defined in claim 1, wherein the means for providing alternating current power to the battery charger and transfer circuitry comprises a line transformer with primary windings for interconnection with 120 VAC and 277 VAC unswitched utility power and secondary windings for powering said battery charger and transfer circuitry.

28. An emergency lighting fluorescent pack as defined in claim 1, wherein the means of the transfer circuitry for sensing utility AC power and for providing activation of the emergency power generating means incorporates a first diode in series with a capacitor, said diode driven by the means for providing alternating current power to the transfer circuitry and charging said capacitor when the alternating current power is present, a second diode with its anode connected to the cathode of the first diode at the junction of the connection of the first diode with the capacitor, a first PNP transistor having a first base biasing resistor connected between the cathode of the second diode and the base of the first transistor, a second base biasing resistor connected between the cathode of the second diode and the positive output of the battery pack, and the base of the first transistor having its emitter electrically interconnected with the positive output of the battery pack, a second PNP transistor electrically connected to the collector output of the first transistor, having an output interconnected to the emergency power generating means so as to activate said generating means if said second transistor output is in the conducting state, and a base biasing resistor interconnected to the negative output of the battery pack, whereby when utility AC power is present the capacitor charges causing a voltage at the cathode of the second diode to be greater than the output voltage of the battery pack thereby biasing the first transistor into a non-conducting state so that the second transistor is also maintained in a non-conducting state thereby de-activating the emergency power generating means, and whereby when utility AC power falls below said predetermined level the capacitor discharges causing the cathode voltage of the second diode to fall below the output voltage of the battery pack thereby causing the first transistor to start conducting current which in turn causes the second transistor to start conducting current and thereby activating the emergency power generating means.

29. An emergency lighting fluorescent pack for use with fluorescent fixtures using a dual lamp ballast and normally powered by a source of utility AC, wherein one of the lamps having its outputs inductively coupled to the ballast is driven by the pack when the utility AC power falls below a predetermined level and wherein the emergency lighting pack may be mountable either in line with this driven lamp or nearby the driven lamp, the driven lamp then being normally mounted within the fluorescent fixture, comprising:

(A) a housing mountable to the fluorescent fixture, having male bi-pins at one end of said housing for interconnection with a female fluorescent socket of said fluoroescent fixture electrically connected to said dual lamp ballast, and a female fluorescent socket electrically connected to said male bi-pin mounted to the housing at its opposite end for interconnection with the male bi-pins at one end of the driven fluorescent lamp, said lamp having a length less than the fluorescent lamps normally used in the fluorescent fixture when the emergency pack is mounted in line therewith, and a length equal to the length of the lamps normally used in the fluorescent fixture when the emergency pack is mounted alongside side lamp, the housing having a length when combined with the lamp used in the in line mounting of the pack approximately equal to the length of the fluorescent lamps normally used in the fluorescent fixture, the housing further comprising removable end caps for covering the male bi-pins and the female fluorescent socket thereof when the emergency pack is mounted nearby the driven fluorescent lamp;

(B) a battery pack incorporating one or more batteries;

(C) a battery charger electrically connected to said battery pack for charging the batteries incorporated in said battery pack when normal utility AC power is present;

(D) means, powered by said battery pack, for generating emergency power for illuminating the driven fluorescent lamp;

(E) means, interconnectable with the driven fluorescent lamp and interconnected to the emergency powered generating means, for providing the generated emergency power to the driven fluorescent lamp;

(F) a safety cradle mountable to the fluorescent fixture so as to be adjacent the driven fluorescent lamp, said safety cradle having means for detecting the placement of the driven fluorescent lamp within the safety cradel in a predetermined fashion representing proper placement of said lamp within the fixture;

(G) transfer circuitry interconnected to the battery pack, emergency power generating means, and safety cradle having first means for sensing utility AC power and providing the energization of said emergency power generating means by said battery pack when utility AC power falls below a predetermined level, second means, electrically interconnected with said fluorescent lamp alignment means of the safety cradle for de-energizing the fluorescent sockets of the fluorescent fixture interconnected with the dual-lamp ballast when the driven fluorescent lamp is not aligned in said predetermined fashion within the safety cradle, and third means, interconnected with said first means of the transfer circuitry, for preventing activation of the emergency power generating means regardless of the condition of the utility AC power, thereby allowing for de-energization of the fluorescent fixture during times when the fluorescent lamp driven by the emergency pack is being installed or adjusted; and (H) a line transformer interconnectable between the utility AC power and the battery charger and transfer circuitry for providing alternating current power to the battery charger and transfer circuitry;

whereby said emergency lighting fluorescent pack, (1) provides for utility AC energization of the lamps within the fluorescent fixture driven by the dual-lamp ballast when the driven lamp is properly installed in the fixture and utility AC power is above said predetermined level;

(2) de-energizes the fluorescent sockets of the fluorescent fixture interconnected with the dual-lamp ballast as well as the emergency power generating means of said pack when the fluorescent lamp driven by said pack is not properly installed within the fluorescent fixture; and (3) provides for emergency power to said driven lamp when it is properly installed within the fluorescent fixture and the utility AC power falls below said predetermined level.

30. An emergency lighting fluorescent pack as defined in claim 29, further comprising:

(I) a testswitch and pilot light, interconnected between the transfer circuitry and the line transformer, for simulating a power failure in order to test the emergency mode operation of the emergency fluorescent pack, as well as to indicate to the user via the pilot light when normal AC power is being supplied to the fluorescent pack.

31. An emergency lighting fluorescent pack as defined in claim 30, wherein the means for generating emergency power incorporates a high frequency oscillator, drive circuitry interconnected with said oscillator, and a ferro-resonant transformer having primary windings driven by said drive circuitry in conjunction with power supplied by said battery pack, so as to generate a high frequency sinusoidal output across its secondary winding, said output powering said driven fluorescent lamp during emergency mode operation.

32. An emergency lighting fluorescent pack as defined in claim 31, wherein a high frequency bypass capacitor is mounted in series between one of the outputs of the ferroresonant transformer and the driven fluorescent lamp for allowing high frequency AC power to drive the fluorescent lamp when the utility AC power falls below said predetermined level while preventing low frequency utility AC voltage from driving the secondary of the ferro-resonant transformer when normal utility AC power is present.

33. An emergency lighting fluorescent pack as defined in claim 32, wherein said oscillator operates at approximately 11 kilohertz; thereby making the inductive portion of the dual-lamp ballast of the fluorescent fixture act as a high impedance and consequently a negligible power drain to the emergency power generating means.

34. An emergency lighting fluorescent pack as defined in claim 30, wherein the secondary winding output of the ferroresonant transformer has an operating curve with a high voltage portion and a constant current portion, the high voltage portion at a voltage substantially higher than the normal operating voltage of the driven fluorescent lamp, so as to ignite said lamp without heating the filament windings within said lamp, and wherein the constant current portion of the operating curve drives the fluorescent lamp at a voltage approximately equal to its normal operating voltage and at a current level that provides a current limiting ballast simulating function to the driven lamp at a resultant power level less than that required for emergency lamp ignition, whereby the fluorescent lamp is ignited without the need for powering its filament windings and without the need for providing ballast for maintaining poper current flow through the lamp once ignited 35. An emergency lighting fluorescent pack as defined in claim 34, wherein the secondary winding output of the ferro-resonant transformer has an operating curve defined by a smooth curve having values substantially corresponding to those in the following table:

| Output Current (milliamperes rms) | Output Voltage (volts rms) |
| --- | --- |
| 0 | 570 |
| 5 | 565 |
| 10 | 562 |
| 15 | 560 |
| 20 | 535 |
| 25 | 490 |
| 30 | 435 |
| 35 | 345 |
| 40 | 170 |
| 42 | 0 |

36. An emergency lighting fluorescent pack as defined in claim 35, wherein the ferro-resonant transformer incorporates four primary windings and wherein the oscillator has two symmetrical outputs and said drive circuitry incorporates a first pair of drive transistors respectively driven by the outputs of said oscillator, the collector currents of said drive transistors respectively passing through two of said primary windings, said transistors respectively driving a pair of switching transistors having their collector currents respectively passing through the other two primary windings; thereby providing for the energization of the primary windings of the ferro-resonant transformer by having the collector currents of both the driving and switching transistors pass through the primary windings, consequently minimizing power loss in the drive circuitry and extending the length of time that the battery pack can supply power to the fluorescent pack.

37. An emergency lighting fluorescent pack as defined in claim 36, wherein the safety cradle means for detecting the presence of the driven fluorescent lamp within the safety cradle incorporates a switch having a depending lever extending within the region where said fluorescent lamp is to be placed when it is properly installed within the fluorescent fixture.

38. An emergency lighting fluorescent pack as defined in claim 37, wherein the safety cradle has an elongated concave recess dimensioned similar to the longitudinal peripheral section of the driven fluorescent lamp, wherein the depending lever of said switch extends within this elongated concave recess for detecting the proper alignment of the fluorescent lamp.

39. An emergency lighting fluorescent pack as defined in claim 38, wherein said concave recess is angularly positionable with respect to the fluorescent fixture so as to accommodate the extrance angle of the shorter lamp with respect to the fixture socket.

40. An emergency lighting fluorescent pack as defined in claim 38, wherein the transfer circuitry second means for de-energizing the fluorescent sockets of the fluorescent fixture comprises a relay having a coil and a pair of electrical contacts, said coil interconnected with the means for detecting the presence of the fluorescent lamp within the safety cradle, said relay contacts in series with at least one side of the utility AC power connected to the lamp ballast so as to open the relay contacts if said means for detecting the presence of the fluorescent lamp indicates that the lamp is not within the safety cradle in said predetermined fashion.

41. An emergency lighting fluorescent pack as defined in claim 40, wherein the testswitch and pilot light are mounted in the same fixture, the testswitch having a pushbutton and the fixture depending downwardly from said housing to facilitate use of the testswitch by an operator.

42. An emergency lighting fluorescent pack as defined in claim 41, wherein the fluorescent fixture further comprises a translucent lens cover removably mounted beneath the fluorescent lamps, and wherein the amount said depending fixture housing the testswitch and pilot light extends is adjustable so that the termination of said testswitch/pilot light combination can contact the inside surface of the lens cover in order to allow the observer to see the condition of the pilot light through the lens cover and allow activation of the pushbutton testswitch without opening the lens cover.

43. An emergency lighting fluorescent pack as defined in claim 42, wherein the transfer circuitry further incorporates fourth means for de-energizing the means for generating emergency power when the battery pack voltage falls below a predetermined level; thereby preventing deep discharge of said battery pack.

44. An emergency lighting fluorescent pack as defined in claim 43, wherein said fourth means incorporates a series of diodes electrically interconnected with each other in cathode to anode relationship and interconnected with first and second switching devices so that the second switching device prevents the first switching device from activating the emergency power generating means when the battery voltage approximately equals the forward voltage drop across the series connected diodes.

45. An emergency lighting fluorescent pack as defined in claim 44, wherein the switching devices are transistors, the second transistor preventing base current flow in the first transistor when the battery voltage falls below said predetermined level.

46. An emergency lighting fluorescent pack as defined in claim 45, wherein the means of the transfer circuitry for sensing utility AC power and for providing activation of the emergency power generating means incorporates a first diode in series with a capacitor, said diode driven by one of the secondary windings of the line transformer so as to charge the capacitor when utility AC power is present, a second diode with its anode connected to the cathode of the first diode at the junction of the connection of the first diode with the capacitor, a first base biasing resistor connected between the cathode of the second diode and the base of the first transistor of said fourth means, said transistor of the PNP type, a second base biasing resistor connected between the cathode of the second diode and the positive output of the battery pack, the first transistor having its emitter electrically interconnected with the positive output of the battery pack, a third transistor of the PNP type electrically connected to the collector output of the first transistor, having an output interconnected to the oscillator of the emergency power generating means so as to activate said oscillator if the third transistor output is in the conducting state, and a base biasing resistor interconnected to the negative output of the battery pack through the switch of the safety cradle, whereby when utility AC power is present, the capacitor charges causing a voltage at the cathode of the second diode to be greater than the output voltage of the battery pack thereby biasing the first transistor into a non-conducting state so that the third transistor is also maintained in a non-conducting state thereby de-activating the emergency power generating means, and whereby when utility AC power falls below said predetermined level, the capacitor discharges causing the cathode voltage of the second diode to fall below the output voltage of the battery pack thereby causing the first transistor to start conducting current which in turn causes the third transistor to start conducting current and activating the emergency power generating means provided that the safety cradle switch is in the closed position so as to allow base current flow through the third transistor.

47. An emergency lighting fluorescent pack as defined in claim 46 wherein the means interconnected to the emergency power generating means and interconnectable with the driven fluorescent lamp when the pack is mounted in line therewith for providing the generated emergency power to the driven lamp utilizes the female fluorescent socket of said housing for providing emergency power to the lamp at one end thereof, and wherein said providing means further incorporates at the other end of the driven lamp for in line mounting and at both ends of the driven lamp for nearby mounting of the emergency pack, in conjunction with the primary side of the line transformer, and the second means of the transfer circuitry for de-energizing the fluorescent sockets of the fluorescent fixture, a first electrical harness electrically connected to the fluorescent pack at one end thereof, a polarized connector at the other end of said harness, a second harness, and a mating polarized plug connected at one end to the second harness for interconnection with the polarized plug of the first harness, said second harness incorporating electrical wires,
　(1) for interconnection to the ballast of the fluorescent fixture;
　(2) for interconnection to the fluorescent lamp driven by the emergency power fluorescent pack; and
　(3) for interconnection with an unswitched source of utility AC power.

48. An emergency lighting fluorescent pack for use with a fluorescent fixture normally energized by utility AC power, the fixture using a lamp ballast and one or more fluorescent lamps, at least one of the lamps designated the "driven lamp" to be energized by the fluorescent pack when the utility AC power level falls below a predetermined level, comprising:
　(A) a battery pack incorporating one or more batteries;
　(B) a battery charger electrically connected to said battery pack for charging the batteries incorporated in said battery pack when normal line current is present;

(C) means, interconnected to the battery pack, for generating emergency power for illuminating the "driven lamp";

(D) means, interconnectable with the "driven lamp" and interconnected to said emergency power generating means, for providing the generated emergency power to said "driven lamp";

(E) a safety cradle mountable to the fluorescent fixture so as to be adjacent the "driven lamp", said safety cradle having means for detecting the placement of the "driven lamp" within the safety cradle in a predetermined fashion representing proper placement of said lamp within the fixture;

(F) transfer circuitry interconnected to the battery pack, emergency power generating means, and safety cradle having first means for sensing utility AC power and for providing the energization of said emergency power generating means by said battery pack when utility AC power level falls below a predetermined level, second means, electrically interconnected with said fluorescent lamp alignment means of the safety cradle for de-energizing the fluorescent sockets of the fluorescent fixture when the "driven lamp" is not aligned in said predetermined fashion within the safety cradle, and third means for preventing the activation of the emergency power generating means regardless of the condition of the utility AC power, thereby allowing for the de-energization of the fluorescent fixture during times when the "driven lamp" is being installed or adjusted; and (G) means, interconnectable between unswitched utility AC power and said battery charger and transfer circuitry for providing alternating current power to said battery charger and transfer circuitry; whereby said emergency lighting fluorescent pack 1) provides for utility AC energization of the lamps within the fluorescent fixture when the lamp driven by the pack is properly installed in the fixture and the utility AC power is above said predetermined level; 2) de-energizes the fluorescent sockets of said fluorescent fixture as well as the emergency power generating means of said pack when the "driven lamp" is not properly installed within the fluorescent fixture; and 3) provides emergency power to said "driven lamp" when it is properly installed within the fluorescent fixture and the utility AC power falls below said predetermined level.

49. An emergency lighting fluorescent pack as defined in claim 48, wherein said means for detecting the presence of the "driven lamp" within the safety cradle incorporates a switch having a depending lever extending within the region where said "driven lamp" is to be placed when it is properly installed within the fluorescent fixture.

50. An emergency lighting fluorescent pack as defined in claim 49, wherein said safety cradle has an elongated concave recess dimensioned similar to a longitudinal peripheral section of the "driven lamp", and wherein the depending lever of said switch extends within this elongated concave recess for detecting the proper alignment of the "driven lamp".

51. An emergency lighting fluorescent pack as defined in claim 50, wherein the concave recess is angularly positionable with respect to the fluorescent fixture so as to accommodate the entrance angle of the "driven lamp" with respect to the fixture socket.

52. An emergency lighting fluorescent pack as defined in claim 48, wherein the transfer circuitry second means for de-energizing the fluorescent sockets of the fluorescent fixture comprises a relay having a coil and a pair of electrical contacts, said coil interconnected with the means for detecting the presence of the "driven lamp" within the fluorescent fixture, said relay contacts in series with at least one side of the utility AC power connected to the lamp ballast so as to open the relay contacts and thus the AC power to the lamp ballast if the means for detecting the presence of the "driven lamp" indicates that the lamp is not within the safety cradle in said predetermined fashion.

53. An emergency lighting fluorescent pack as defined in claim 52, wherein the first means of the transfer circuitry for sensing utility AC power and for providing activation of the emergency power generating means incorporates a first diode in series with a capacitor, said diode driven by the means for providing alternating current power to the transfer circuitry and charging said capacitor when the alternating current power is present, a second diode with its anode connected to the cathode of the first diode at the junction of the connection of the first diode with the capacitor, a first PNP transistor having a first base biasing resistor connected between the cathode of the second diode and the base of the transistor, a second base biasing resistor connected between the cathode of the second diode and the positive output of the battery pack, and the transistor having its emitter electrically interconnected with the positive output of the battery pack, a second PNP transistor electrically connected to the collector output of the first transistor, having an output interconnected to the emergency power generating means so as to activate said generating means if said second transistor output is in the conducting state, and a base biasing resistor interconnected to the negative output of the battery pack, whereby when utility AC power is present the capacitor charges causing a voltage at the cathode of the second diode to be greater than the output voltage of the battery pack thereby biasing the first transistor into a non-conducting state so that the second transistor is also maintained in a non-conducting state thereby deactivating the emergency power generating means, and whereby when utility AC power falls below said predetermined level the capacitor discharges causing the cathode voltage of the second diode to fall below the output voltage of the battery pack thereby causing the first transistor to start conducting current which in turn causes the second transistor to start conducting current and thereby activating the emergency power generating means.

54. An emergency lighting fluorescent pack as defined in claim 53, wherein the transfer circuitry third means for preventing activation of the emergency power generating means incorporates electrical interconnection of the safety cradle switch to the base biasing resistor of the second transistor so as to prevent base biasing current therethrough regardless of the conducting state of the first transistor, thereby overriding activation of the transfer circuitry first means and thereby insuring de-energization of the fluorescent lamp sockets and the means interconnectable with the driven fluorescent lamp for providing emergency electrical power thereto, and consequently insuring no electrical shock hazard when changing or adjusting the driven fluorescent lamp.

55. An emergency lighting fluorescent pack as defined in claim 52, further comprising:
(H) a testswitch and pilot light interconnected between the transfer circuitry and the means for interconnecting said transfer circuitry with unswitched utility AC power for simulating a power failure in order to test the emergency mode operation of the emergency fluorescent pack as well as to indicate to the user via the pilot light that normal AC power is being supplied to the fluorescent pack.

56. An emergency lighting fluorescent pack as defined in claim 55, further comprising:
(I) a housing enclosing the battery pack, battery charger, emergency power generating means, and transfer circuitry, and wherein the testswitch and pilot light are mounted in the same fixture, the testswitch having a push-button and the fixture depending downwardly from said housing to facilitate use of the testswitch by an operator.

57. An emergency lighting fluorescent pack as defined in claim 56, wherein the fluorescent fixture further incorporates an operable translucent lens cover beneath the fluorescent lamps, and wherein the amount said depending fixture extends is adjustable so that the termination of said testswitch/pilot light combination can contact the inside surface of the lens cover to the fluorescent fixture in order to allow the observer to see the condition of the pilot light through the lens cover and allow activation of the pushbutton testswitch without opening the lens cover.

58. An emergency lighting fluorescent pack as defined in claim 48, wherein the first means of the transfer circuitry for sensing utility AC power and for providing activation of the emergency power generating means incorporates a first diode in series with a capacitor, said diode driven by the means for providing alternating current power to the transfer circuitry and charging said capacitor when the alternating current power is present, a second diode connected in series with the first diode at the junction of the connection of the first diode with the capacitor, a first PNP transistor having a first base biasing resistor connected between the cathode of the second diode and the base of the transistor, and a second base biasing resistor connected between the cathode of the second diode and the positive output of the battery pack, said transistor having its emitter electrically interconnected with the positive output of the battery pack, a second PNP transistor electrically connected to the collector output of the first transistor and having its collector output interconnected to the emergency power generating means so as to activate said generating means if said second transistor collector output is in the conducting state, whereby when utility AC power is present the capacitor charges causing a voltage at the cathode of the second diode to be greater than the output voltage of the battery pack thereby biasing the first transistor into a non-conducting state so that the second transistor is also maintained in a non-conducting state thereby de-activating the emergency power generating means, and whereby when utility AC power falls below said predetermined level the capacitor discharges causing the cathode voltage of the second diode to fall below the output voltage of the battery pack thereby causing the first transistor to start conducting current which in turn causes the second transistor to start conducting current and thereby activating the emergency power generating means.

59. An emergency lighting fluorescent pack as defined in claim 58, wherein the transfer circuitry first means further comprises a third transistor having a collector interconnected with the base biasing resistors of the first transistor, having a base interconnected with the output current of the first transistor so that the third transistor is in the conducting state when the first transistor begins to conduct, the third transistor thereby maintaining the base voltage of the first transistor below the emitter voltage thereof and thereby latching the first transistor into the conducting state.

60. An emergency lighting fluorescent pack as defined in claim 48, wherein the transfer circuitry further incorporates fourth means for de-energizing the means for generating emergency power when the battery pack voltage falls below a predetermined level; thereby preventing deep discharge of the battery pack.

61. An emergency lighting fluorescent pack as defined in claim 60, wherein said fourth means for de-energizing the emergency power generating means when the battery pack voltage falls below a predetermined level incorporates a series of diodes electrically interconnected with each other in anode to cathode relationship and interconnected with a switching device so as to prevent the switching device from causing the activation of the emergency power generating means when the battery voltage approximately equals the forward voltage drop across the series-connected diodes.

62. An emergency lighting fluorescent pack as defined in claim 61, wherein the switching device is a transistor in series with said series-connected diodes.

63. An emergency lighting fluorescent pack as defined in claim 48, wherein the means for providing alternating current power to the battery charger and transfer circuitry incorporates a line transformer with primary windings for interconnection with 120 VAC and 277 VAC unswitched utility power and secondary windings for powering the battery charger and transfer circuitry.

64. An emergency lighting fluorescent pack as defined in claim 63, wherein the means for providing alternating current power to the battery charger and transfer circuitry further incorporates in conjunction with the means interconnectable with the fluorescent lamp and the emergency power generating means, and the second means of the transfer circuitry for de-energizing the fluorescent sockets of the fluorescent fixture, a first electrical harness electrically connected at one end to the fluorescent pack, a polarized connector at the other end of said harness, a second harness, and a mating polarized plug connected at one end to the second harness for interconnection with the polarized plug of the first harness, said second harness incorporating electrical wires, (1) for interconnection to the ballast of the fluorescent fixture; (2) for interconnection to the fluorescent lamp driven by the emergency power fluorescent pack; and (3) for interconnection with an unswitched source of utility AC power.

65. An emergency lighting fluorescent pack for use with fluorescent fixtures using a lamp ballast and at least one fluorescent lamp comprising:
(A) a battery pack incorporating one or more batteries;
(B) a battery charger electrically connected to said battery pack for charging the batteries incorporated in said battery pack when normal line current is present;

(C) an emergency power generating means interconnectable with at least one of the fluorescent lamps of the fluorescent fixture for providing emergency power thereto, incorporating
  (1) an oscillator,
  (2) drive circuitry interconnected with said oscillator, and
  (3) a ferro-resonant transformer having primary windings driven by said drive circuitry in conjunction with power supplied by said battery pack, so as to generate a substantially sinusoidal output across its secondary winding, said output powering said fluorescent lamp during emergency mode operation; wherein the secondary winding output of the ferro-resonant transformer has an operating curve with a high voltage portion and a constant current portion, the high voltage portion at a voltage substantially higher than the normal operating voltage of the fluorescent lamp driven by the emergency lighting pack so as to ignite said lamp without heating the filament windings within the lamp, and wherein the constant current portion of the operating curve drives the fluorescent lamp at a voltage approximately equal to its normal operating voltage and at a current level that provides a current limiting ballast simulating function to the driven lamp at a resultant power level less than that required for emergency lamp ignition;

(D) transfer circuitry interconnected to said battery pack and emergency power generating means having means for sensing utility AC power and for providing activation of the oscillator of the emergency power generating means when the utility AC power level falls below a predetermined level; and (E) means for providing unswitched utility AC power to the battery charger and transfer circuitry, whereby the fluorescent lamp, when powered by the fluorescent pack, is ignited without the need for powering its filament windings and without the need for providing ballast for maintaining proper current flow through the lamp once ignited.

66. An emergency lighting fluorescent pack as defined in claim 65, wherein the oscillator operates at a high frequency.

67. An emergency lighting fluorescent pack as defined in claim 66, wherein the ferro-resonant transformer incorporates a capacitor across its secondary winding for facilitating generation of the high frequency sinusoidal output.

68. An emergency lighting fluorescent pack as defined in claim 67, wherein the emergency power generating means further incorporates a bypass capacitor in series with the secondary winding of the ferro-resonant transformer for preventing substantial current flow through the secondary winding of the ferro-resonant transformer when normal utility AC is powering the interconnected lamp while allowing the 11 kilohertz output of the emergency power generating means to drive the interconnect lamp when the utility AC falls below said predetermined level.

69. An emergency lighting fluorescent pack as defined in claim 66, wherein the secondary winding output of the ferroresonant transformer has an operating curve defined by a smooth curve having values substantially corresponding to those in the following table:

| Output Current (milliamperes rms) | Output Voltage (volts rms) |
|---|---|
| 0 | 570 |
| 5 | 565 |
| 10 | 562 |
| 15 | 560 |
| 20 | 535 |
| 25 | 490 |
| 30 | 435 |
| 35 | 345 |
| 40 | 170 |
| 42 | 0 |

70. An emergency lighting fluorescent pack as defined in claim 69, wherein the ferro-resonant transformer incorporates four primary windings and wherein the oscillator has two symmetrical outputs and said drive circuitry incorporates a first pair of drive transistors respectively driven by the outputs of said oscillator, the collector currents of said drive transistors respectively passing through two of said primary windings, said transistors respectively driving a pair of switching transistors having their collector currents respectively passing through the other two primary windings; thereby providing for the energization of the primary windings of the ferro-resonant transformer by having the collector currents of both the driving and switching transistors pass through the primary windings, consequently minimizing power loss in the drive circuitry and extending the length of time that the battery pack can supply power to the fluorescent pack.

71. An emergency lighting fluorescent pack as defined in claim 70, wherein the core of the ferro-resonant transformer has two E-shaped members facing each other, the center leg of each member having an air gap of approximately 0.075 inches therebetween, said center legs forming a magnetic shunt.

72. An emergency lighting fluorescent pack as defined in claim 71, wherein the core is fabricated from a Type 77 or equivalent core material manufactured by Fair-rite Products Corporation, of Wallkill, New York.

* * * * *

UNITED STATES PATENT AND TRADEMARK OFFICE
CERTIFICATE OF CORRECTION

PATENT NO. : 4,144,462
DATED : March 13, 1979
INVENTOR(S) : Richard L. Sieron et al.

It is certified that error appears in the above-identified patent and that said Letters Patent are hereby corrected as shown below:

Column 7, line 9, "conjunction" should be --connection--.

Column 9, line 36, after "to which" delete --the fluorescent fixture socket 46 to which--

Column 9, line 62, "deenergizing" should be --de-energizing--.

Column 15, line 16, "deenergizing" should be --de-energizing--.

Column 18, line 30, insert --for-- after "light".

Column 21, line 59, "to" should be --at--.

Column 23, line 36, "claim 16" should be --claim 18--.

Column 23, line 41, "light" should be --lighting--.

UNITED STATES PATENT AND TRADEMARK OFFICE
CERTIFICATE OF CORRECTION

PATENT NO. : 4,144,462
DATED : March 13, 1979
INVENTOR(S) : Richard L. Sieron et al.

It is certified that error appears in the above-identified patent and that said Letters Patent are hereby corrected as shown below:

Column 26, line 30, "side" should be --said--.

Column 26, line 57, "cradel" should be --cradle--.

Column 28, line 18, "poper" should be --proper--.

Column 29, line 4, "extrance" should be --entrance--.

Signed and Sealed this

Twenty-eighth Day of August 1979

[SEAL]

Attest:

LUTRELLE F. PARKER
*Attesting Officer*     *Acting Commissioner of Patents and Trademarks*